(12) United States Patent
Trimarco et al.

(10) Patent No.: US 10,930,486 B2
(45) Date of Patent: Feb. 23, 2021

(54) DEVICE FOR EXTRACTING VOLATILE SPECIES FROM A LIQUID

(71) Applicant: Danmarks Tekniske Universitet, Kgs. Lyngby (DK)

(72) Inventors: Daniel Bøndergaard Trimarco, Valby (DK); Peter Christian Kjærgaard Vesborg, Charlottenlund (DK); Thomas Pedesen, Valby (DK); Ole Hansen, Hørsholm (DK); Ib Chorkendorff, Birkerød (DK)

(73) Assignee: DANMARKS TEKNISKE UNIVERSITET, Lyngby (DK)

( * ) Notice: Subject to any disclaimer, the term of this patent is extended or adjusted under 35 U.S.C. 154(b) by 361 days.

(21) Appl. No.: 15/526,774

(22) PCT Filed: Nov. 11, 2015

(86) PCT No.: PCT/EP2015/076358
§ 371 (c)(1),
(2) Date: May 15, 2017

(87) PCT Pub. No.: WO2016/075208
PCT Pub. Date: May 19, 2016

(65) Prior Publication Data
US 2017/0338090 A1 Nov. 23, 2017

(30) Foreign Application Priority Data
Nov. 14, 2014 (EP) ..................................... 14193254

(51) Int. Cl.
B01D 53/22 (2006.01)
H01J 49/04 (2006.01)
(Continued)

(52) U.S. Cl.
CPC ........ *H01J 49/0427* (2013.01); *G01N 1/4005* (2013.01); *H01J 49/0018* (2013.01);
(Continued)

(58) Field of Classification Search
CPC ............... H01J 49/0018; H01J 49/0427; H01J 49/0404; G01N 1/4005; G01N 2001/4066; G01N 2001/4016
See application file for complete search history.

(56) References Cited

U.S. PATENT DOCUMENTS 3,079,852 A * 3/1963 Little, III ................. G03D 3/06
137/256
3,225,578 A * 12/1965 Krieger .................. B21D 26/12
72/56
(Continued)

FOREIGN PATENT DOCUMENTS

DE 102011085749 B3 2/2013
EP 2273531 A1 1/2011
(Continued)

OTHER PUBLICATIONS

Bondergaard D. et al. Fast and sensitive method for detecting volatile species in liquids, Sep. 30, 2014.
(Continued)

*Primary Examiner* — Anthony R Shumate
(74) *Attorney, Agent, or Firm* — Pearne & Gordon LLP

(57) ABSTRACT

The invention relates to a device (10) for extracting volatile species from a liquid (20) connected to an inlet of an analysis instrument, such as a mass spectrometer (MS). The device has a chamber (4), a membrane (5) forming a barrier for the liquid at zero differential pressure between the inside and the outside of the chamber, and allowing passage of the volatile species at zero differential pressure between the inside and the outside of the chamber. The device has an
(Continued)

inlet capillary channel (3) to feed in a carrier gas and prevent back-diffusion from the chamber, and an outlet capillary channel (6) which provides a significant pressure reduction, e.g. from atmospheric pressure in the chamber (4) to near-vacuum suitable for an MS. The invention combines the best of two worlds, i.e. the fast time-response of a DEMS system and the high sensitivity of a MIMS system, since a differential pumping stage is not needed.

29 Claims, 15 Drawing Sheets

(51) Int. Cl.
*H01J 49/00* (2006.01)
*G01N 1/40* (2006.01)
(52) U.S. Cl.
CPC .. *H01J 49/0404* (2013.01); *G01N 2001/4016* (2013.01); *G01N 2001/4066* (2013.01)

(56) References Cited

U.S. PATENT DOCUMENTS

| | | | | |
|---|---|---|---|---|
| 3,321,278 | A | * | 5/1967 | Theuerer ............... C01B 33/06 117/102 |
| 3,397,278 | A | | 8/1968 | Pomerantz |
| 4,008,388 | A | | 2/1977 | McLafferty |
| 4,187,856 | A | | 2/1980 | Hall |
| 4,257,257 | A | | 3/1981 | Dairaku |
| 4,340,615 | A | | 7/1982 | Goodwin |
| 4,715,217 | A | | 12/1987 | Coyne |
| 4,746,631 | A | * | 5/1988 | Clagett ............ G01N 33/54306 422/412 |
| 4,803,170 | A | * | 2/1989 | Stanton ............... G01N 33/533 422/412 |
| 4,821,585 | A | | 4/1989 | Kempe |
| 5,426,480 | A | * | 6/1995 | Sawada ................ G03D 3/132 396/617 |
| 5,429,842 | A | * | 7/1995 | Appel .................. B05D 1/206 118/402 |
| 5,448,062 | A | | 9/1995 | Cooks |
| 5,795,459 | A | * | 8/1998 | Sweeney ............. C02F 1/46104 204/271 |
| 6,021,679 | A | | 2/2000 | Li |
| 6,277,329 | B1 | | 8/2001 | Evans |
| 6,321,868 | B1 | * | 11/2001 | Mignot .................... G01V 1/04 181/120 |
| 8,347,687 | B2 | | 1/2013 | Cunningham |
| 2005/0160801 | A1 | | 7/2005 | Brumboiu |
| 2006/0097157 | A1 | | 5/2006 | Ouyang |
| 2007/0007214 | A1 | * | 1/2007 | Zha ....................... B01D 61/18 210/718 |
| 2007/0295605 | A1 | * | 12/2007 | Park ..................... F04B 19/006 204/601 |
| 2010/0170847 | A1 | * | 7/2010 | Zha ....................... B01D 63/02 210/636 |
| 2011/0036238 | A1 | | 2/2011 | Pesch |
| 2011/0253891 | A1 | | 10/2011 | Hashimoto |
| 2012/0208004 | A1 | | 8/2012 | Wolcott |
| 2014/0085822 | A1 | * | 3/2014 | Campbell .............. H05K 7/203 361/700 |

FOREIGN PATENT DOCUMENTS

| | | |
|---|---|---|
| JP | 63118632 | 5/1988 |
| WO | WO 2007/115807 A1 | 10/2007 |

OTHER PUBLICATIONS

Duval, M., Dissolved Gas Analysis: It Can Save Your Transformer, IEEE Electrical Insulation Magazine, Nov./Dec. 1989, vol. 5, 6.
Henriksen T.R., et al., Highly sensitive silicon microreactor for catalyst testing, Review of Scientific Instruments, Dec. 7, 2009, vol. 80, No. 12, pp. 124101-1.
Henriksen, T.R., Silicon Microreactors for Measurements of Catalytic Activity, Department of Micro- and Nanotechnology Technical University of Denmark, Apr. 2010.
Hynes A.M., et al., Recent advances in silicon etching for MEMS using the ASE process, Sensors and Actuators A: Physical 74, (1999) pp. 13-17.
International Search Report from related PCT Application No. PCT/EP2015/076358 dated Feb. 2, 2016.
Kelly, J.J., Transformer Fault Diagnosis by Dissolved-Gas Analysis, IEEE Transactions on Industry Applications. vol. IA-16, No. 6, Nov./Dec. (1980).
Kotiaho, Tapio, et al., Membrane Introduction Mass Spectrometry, Analytical Chemistry, vol. 63, No. 18, Sep. 15, 1991.
Lauritsen, Frants R., et al; Advances in Membrane Inlet Mass Spectrometry (MIMS), Reviews in Analytical Chemistry, vol. 15, No. 4, 1996.
Lloyd, David et al.; Direct measurement of dissolved gases in microbiological systems using membrane inlet mass spectrometry, Journal of Microbiological Methods 1 (1983), pp. 313-328.
Lloyd, David et al: Quadrupole Mass Spectrometry in the Monitoring and Control Fermentations; Biosensors 1 (1985) pp. 179-212.
Machine Translation of DE102011085749B3 by Lexis Nexis Total Patent on Aug. 17, 2017.
Maden, Amy J. et al.; Sheet Materials for Use as Membranes in Membrane Introduction Mass Spectrometry; Anal. Chem. 1996; 68, pp. 1805-1811.
Patent Abstract of Japan from Euoprean Patent Office for JP63118632.
Silvon, Laurence E. et al.; Helium-purged Hollow Fiber Membrand Mass Spectrometer Interface for Continuous Measurement of Organic Compounds in Water; Analytical Chemistry. Jul. 1, 1991, vol. 63, pp. 1335-1340.
Woldring, Sabbo et al., Blood Gases: Continuous in vivo Recording of Partial Pressures by-Mass Spectrography, Science, Aug. 19, 1966, vol. 153, No. 3738, pp. 885-887.
Written Opinion from related PCT Application No. PCT/EP2015/076358 dated Feb. 2, 2016.
Yost. R.A. et al; Triple Quadrupole Mass Spectrometry for Direct Mixture Analysis and Structure Elucidation; Analytical Chemistry, Oct. 1979, vol. 51, No. 12, pp. 1251A-1264A.

* cited by examiner

DEVICE FOR EXTRACTING VOLATILE SPECIES FROM A LIQUID

FIELD OF THE INVENTION

The present invention relates to a device for extracting a volatile species from an associated liquid such as a volatile sample. The invention also relates to a corresponding analysis system where the extraction device is connected to an inlet of an analysis instrument, such as a mass spectrometer. The invention also relates to a corresponding method for extracting volatile species from a liquid.

BACKGROUND OF THE INVENTION

In many different scientific as well as industrial fields it is of interest to measure the amount of a certain species dissolved in a liquid. For instance in the field of electrocatalysis, where products are electrochemically evolved at an electrode submerged in an aqueous electrolyte, or in the field of biotechnology where carbon dioxide is evolved in an industrial fermentation process. Depending on the application, it is critical to have both a high sensitivity towards the species in question, and a fast time-response, in order to follow how e.g. a chemical reaction occurs.

A fast and precise way to measure such species is using a vacuum based mass spectrometer (MS), such as a quadrupole mass spectrometer (QMS). It is naturally not possible to expose a QMS vacuum instrument directly to a liquid bath, but if it is possible to extract the species from the liquid phase and into the MS, this is a very prominent method.

Today there are two types of technologies making use of a MS for detection of species dissolved in liquids. These are categorized as follows:

Differential electrochemical mass spectrometry (DEMS), also referred to as on-line electrochemical mass spectrometry (OLEMS) (see FIG. 1a).

Membrane inlet mass spectrometry (MIMS) (see FIG. 1b).

These two technologies are at first glance quite similar and their acronyms are often mistakenly used interchangeably, but there are still some intrinsic differences between the two.

In MIMS, a relatively thick permeable membrane, e.g. dimethyl silicone with a thickness of approximately 0.5-1.0 mm, is used to separate the liquid phase and the MS vacuum chamber. This allows small amounts solvent and solute to diffuse through the membrane material and directly into the mass spectrometer. The flux of species through the membrane depends on the pressure difference across the membrane, the thickness and area of the membrane, and the solubility and diffusivity of the products inside the membrane. Thus by using a thick solid membrane the flux is reduced to a limit that makes it possible to maintain a low pressure inside the MS vacuum chamber using a turbomolecular pump (TMP) ($<10^{-6}$ mbar), allowing the MS to operate optimally. However, this low flux results in a slow time-response of the system, e.g. of the order of minutes or longer, depending on the species and membrane involved. The solubility and diffusivity of species inside the membrane also vary from species to species, which can be an advantage, since a membrane selective towards a certain species, but that in itself can also be a disadvantage, as no two species behave similar.

In DEMS/OLEMS on the other hand there is a stronger focus on the time-response, which is poor in MIMS systems. Therefore DEMS systems often use a much thinner membrane, either made from a solid material like the dimethyl silicone used in MIMS, or a porous and hydrophobic material like e.g. GoreTex with pore sizes down to 20 nm. In either case the advantage is, that flux of solvent and solute through the membrane is much higher, which leads to a faster and nondiscriminating time-response. The downside is, however, that this high flux leads to a large pressure in the MS vacuum chamber, preventing the MS from working properly. In order to prevent this pressure rise, a differential pumping stage (DP) is therefore introduced between the membrane and the MS, hence the word "differential" in the name. This is typically a diaphragm pump, which brings the pressure down to about 1 mbar, after which the turbomolecular pump (TMP) backing the MS vacuum chamber is able to maintain a reasonable working pressure $<10^{-6}$ mbar. The gas flow out through the differential pumping stage is 99% of the total flow and thus only 1% of the total gas flow is flowing to the MS.

The gas that is pumped away naturally contains evaporated solvent, but also analyte in equal proportion, so most of the analyte is lost. Thus a differential pumping stage intrinsically causes a drop of about a factor of 100 in sensitivity compared to MIMS. Another consequence of the high gas flux can be a rapid local cooling near the membrane causing a risk of the inlet freezing or an up-concentration of the electrolyte, both due to water evaporation. Also a high water evaporation leads to a high water background in the MS resulting in high cracking signals of $H_2$ and $O_2$, so in the case of electrochemical hydrogen- and oxygen evolution reaction studies, the sensitivity of the system is reduced even further.

To sum up a MIMS-like system reduces the gas flux into the MS vacuum chamber by e.g. having a thick membrane inlet. This results in a high sensitivity as the species being measured are send directly to the MS, but leads to an intrinsically slow time-response. In a DEMS-like system a much larger gas flux is realized by e.g. using thinner or even porous membranes. This leads to a much faster time-response, but at the same time a drop in sensitivity of a factor of 100 due to the differential pumping stage needed.

Many variations of the generalized DEMS and MIMS systems of course exists, but the compromise between high and low gas flux regarding sensitivity and time-response and the question of making use of a differential pumping stage or not, is common for all.

US patent application 2005/0160801 discloses a probe with sheet membrane trough which analyte may penetrate. On the back side of the membrane, a collector fluid is circulated to carry the analyte. The collector fluid can subsequently convey the analyte to a neighbouring analyzer, but this will lead to a delayed time response in the analyzer, and possible a dilution of analyte during transport. This will be restrict both response time and possibly also sensitivity.

U.S. Pat. No. 4,257,257 relates to an apparatus for detecting volatile species where a carrier gas is passed through a liquid-repellent porous partition tubing having channels extending through the wall of the tubing and immersed in the liquid to be tested, causing a gaseous or volatile substance to permeate through the wall and diffuse into the carrier gas in the tubing. The carrier gas flowing out from the outlet of the tubing and containing a quantity of the substance in equilibrium with the liquid phase is led to a detector connected to the outlet, whereby the concentration of the gaseous or volatile substance in the liquid can be detected continuously or intermittently with high efficiency. The tubing, which is liquid-repellent, prevents ingress of the liquid into the channels but permits the gaseous or volatile substance to diffuse into the carrier gas through a gas layer in the channels at an exceedingly high velocity, thus affording measurements with a short response time. Nevertheless, the carrier gas velocity through the tubing may limit the response time of the detection of the volatile species.

One example of preparing a carrier gas with an analyte before entering into an MS is US patent application 2011/036238, where a membrane is used to separate at least some of the carrier gas from the flow. However this may reduce the response time due to the needed separation before analysis in the MS.

Hence, an improved device for extracting a species from a liquid would be advantageous, and in particular a faster and/or more sensitive extraction device would be advantageous.

OBJECT OF THE INVENTION

It is a further object of the present invention to provide an alternative to the prior art.

In particular, it may be seen as an object of the present invention to provide a extraction device that solves the above mentioned problems of the prior art with sensitivity and/or fast response time.

SUMMARY OF THE INVENTION

Thus, the above described object and several other objects are intended to be obtained in a first aspect of the invention by providing a device for extracting a volatile species from an associated liquid, such as a volatile sample, and being suitable for connection to an inlet of an associated analysis instrument, such as a mass spectrometer, the device comprising:
  a. a chamber, the volume of the chamber may be 1 ml or less,
  b. a membrane, which:
    i. connects the inside of the chamber with the outside of the chamber,
    ii. forms a barrier for the liquid at zero, or near-zero, differential pressure between the inside and the outside of the chamber,
    iii. allows passage of the volatile species at zero, or near-zero, differential pressure between the inside and the outside of the chamber,
  c. an inlet capillary channel which connects the inside of the chamber with the outside of the chamber, the inlet capillary channel being arranged for intake of an inert a carrier gas, such as an inert carrier gas, and
  d. an outlet capillary channel which connects the inside of the chamber with the outside of the chamber, the outlet capillary channel being arranged for connection with said inlet of the associated analysis instrument, wherein the outlet capillary channel may be spatially dimensioned so that the gas kinetics of the species and the carrier gas, after leaving the outlet capillary channel, can be described as a ballistic flow (Knudsen number significantly above 1), or as a near ballistic flow.
wherein, upon immersion of the device into the liquid sample, the device allows the liquid sample to comes into contact with the membrane.

The invention is particularly, but not exclusively, advantageous for obtaining a device, a so-called 'sniffer-chip', that combines the best of both worlds, i.e. the fast time-response of a DEMS system and the high sensitivity of a MIMS system, since a differential pumping stage is not needed. Essentially, that is because of the relatively small volume of the chamber together with the capillary outlet channel being arranged for reducing the pressure from typically a near-atmospheric pressure to a lower pressure regime where the associated analysis instrument, e.g. a MS, can work. Thus, the extraction device provides a new and advantageous interface to vacuum based analysis instruments being applied for liquid analysis.

In the context of the present invention, near ballistic flow may be understood to be a flow with a Knudsen number of at least 0.1, at least 0.5, or at least 0.75.

As explained below the inventors have realized an analysing system where this results in an intrinsic sensitivity improvement of a remarkable factor of about 100 compared to conventional DEMS/OLEMS systems, while maintaining a fast time-response.

The device can be using in an open configuration, where the extraction device can be immersed, or dipped, into any aqueous liquid and detect volatile species dissolved in the liquid, or it can be used in a closed configuration, where the device is interfaced with an electrode-chip with a microfluidic channel system transporting liquid across the membrane. Thus, the term "immersion of the device into the liquid" may be considered to be interpreted as coming into contact with the liquid within the overall fluid system.

Numerous other advantages of the invention are present:
  The amount of liquid solvent carried to the analysis instrument is controlled by the saturation vapor pressure in the carrier gas.
  Because of the use of a carrier gas, the component stagnation at the surfaces of the device is negligible.
  The membrane interface is exposed to ambient so the device can be immersed directly into the liquid.
  There is a high flexibility in positioning the device very close to the sample space.
  Higher flux compared to probes using membrane permeability.
  Stability of the membrane because the pressure at both the sides of the membrane remains equal, or substantially equal.

The present invention may be advantageously applied in connection with:
  Dissolved gas analysis, e.g. for cooling fault detection in transformers or similar, or lubrication monitoring in engine and similar equipment.
  Blood gas analysis.
  Bioreactor control and monitoring.
  Electrochemical analysis (an example is given below).
  Catalysis development and monitoring.

In one embodiment, a substantially plane, such as a plane, side of the device may comprise the membrane, and wherein an outer surface of the membrane is substantially flush, such as flush, with said side of the device, which is advantageous for unrestricted access of the liquid to the membrane surface facing the liquid. Alternatively, the outer surface of the membrane may protrude from said side of the device to obtain improved liquid contact.

In another embodiment, the volume of the chamber may be 1 ml or less, preferably less than 10, 50 or 100 µl, more preferably 100 nl or less, preferably less than 50 nl, more preferably less than 25 nl, such as 8.5 nl or less, such as 8.5 nl. It may be noted that the chamber may be sub-divided into various cavities, e.g. cavities having the shape of elongated fluid or gas channels connecting the chamber above the membrane with the inlet and outlet capillary channels. In the context of the present application, it will thus be understood that when referring to the 'chamber' it could comprise such elongated fluid channels, especially when discussing the internal volume of the extraction device. The chamber immediately above the membrane will also be referred to as the 'gas chamber' in connection with the below detailed description of the invention.

In some embodiments, the membrane may be perforated, but generally the present invention is not limited to any specific type of membrane, i.e. various types and variants of membranes will be readily acknowledged as applicable within the context of the present invention once the teaching and general principle is understood by the skilled person. Thus, the membrane could be homogeneous or heterogeneous, it could perform species transport and/or carrier gas transport actively or passively, it could be described as microfiltration, ultrafiltration, or nanofiltration, it could be perforated or permeable, etc.

The number of holes in the membrane could be at least $10^4$ holes/cm$^2$, possibly at least $10^5$ holes/cm$^2$, preferably at least $10^6$ holes/cm$^2$, more preferably at least $10^7$ holes/cm$^2$. Alternatively, the number of holes could be below $10^5$ holes/cm$^2$, preferably below $10^6$ holes/cm$^2$, more preferably below $10^7$ holes/cm$^2$. Any range of the above minimum and maximum number of holes per area is also contemplated within the context of the present invention, e.g. a number of holes per area in the range from about $10^5$-$10^7$ holes/cm$^2$, or about $10^4$-$10^6$ holes/cm$^2$, etc.

Typically hole diameters for the membrane could be about 1 nm, 10 nm, 100 nm, 1 μm, 10 μm or 100 μm, on the average. Any range of these holes diameters is also contemplated within the context of the present invention, e.g. in the range from about 1-100 nm, or in the range from 1-10 μm, etc.

Preferably the liquid may an aqueous liquid, such as wherein a main component of the liquid sample is water. Alternatively, the liquid could be an oil-based liquid.

Advantageously, the outlet capillary channel is be spatially dimensioned so that the gas kinetics of the species and the carrier gas, after leaving the outlet capillary channel, can be described as a ballistic flow (Knudsen number significantly above 1), or as near ballistic flow. As it will be described in more details below, other parameters, such as temperature, pressure and kind of gas/species, will generally influence this. Nevertheless, the term 'capillary' should also be understood in the sense that the length is significantly larger than the cross-sectional dimension, e.g. width, for the inlet capillary channel. More preferably, the outlet capillary channel may provide a significant pressure reduction i.e. having an atmospheric pressure on one side of the outlet capillary, or lower (e.g. higher than 300 mbar, or higher than 30 mbar, or higher than 3 mbar) or higher (e.g. higher than 10 bar, or higher than 5 bar, or higher than 1 bar), such as within the chamber, and $10^{-4}$ mbar or less, preferably $10^{-5}$ mbar or less, more preferably $10^{-6}$ mbar or less on the other side of the outlet capillary channel, such as the outlet capillary channel may enable supporting of a differential pressure on either side of the outlet capillary channel of about 1 atmosphere or more.

In some embodiments, the analysis instrument may require vacuum conditions, preferably high vacuum conditions, such a mass spectrometer, but optically, micromechanically and acoustically based analysis systems could also be implemented within the context of the present invention. The vacuum conditions in turn will set corresponding limits on the dimensions of the outlet capillary channel and resulting pressure reduction.

It should be noted that the inlet capillary channel should be designed with due consideration of the outlet capillary channel i.e. they should in combination be dimensioned to sustain a suitable pressure in practical conditions, e.g. around 1 atmosphere, inside the chamber facing the membrane. The inlet capillary channel should typically not provide a large pressure reduction—like the outlet capillary channel—but the inlet capillary channel should prevent, or at least limit, back diffusion from the chamber (containing the species from the membrane). Thus, the inlet capillary channel may be spatially dimensioned so that limited, preferably no, back-diffusion occurs from the chamber.

In some embodiment, the device may comprise at least
a. a first structural element, such as the first structural element being made of silicon and/or being monolithic, and
b. a second structural element, such as the second structural element being made of glass, and/or being monolithic, such as the glass being Pyrex glass, and wherein the membrane is formed in the first structural element and on a first side of the first structural element,
and wherein the second structural element is joined, such as bonded, such as joined so as to form a gas tight seal between the first structural element and the second structural element to the first structural element on the opposite side of the first structural element with respect to the first side, thereby enabling efficient and cost-effective manufacturing by micro-machining methods and procedures, e.g. for semiconductor manufacturing. Additionally, one or more cavities may be formed in the first structural element, wherein one, or more, cavities correspond to one or more, such as all, of
a. the chamber,
b. the inlet capillary,
c. the outlet capillary,
and wherein the second structural element may form a barrier in least one of the one, or more, cavities.

Furthermore, wherein one, or more, such as all, of
a. the chamber,
b. the inlet capillary,
c. the outlet capillary,
may be placed between
the first side of the first structural element, and
the second structural element.

In one embodiment, a device may have the outlet capillary channel and/or the inlet capillary channel being encircled around an axis being parallel with a flow-direction through the channel(s) by an encircling material, wherein an outer periphery of a cross-section of said encircling material in a plane being orthogonal to said flow-direction is substantially circular, such as circular, to support a stable construction of the device.

In a second aspect, the invention relates to a system for analysis comprising
a device according to the first aspect, and
an analysis instrument, such as a mass spectrometer,
where the outlet capillary of the device is gasiously connected with an inlet of the analysis instrument. The second aspect is particular beneficial in that the existing analysis system may relative easily be modified to incorporate the extraction device in combination with e.g. a mass spectrometer so as to implement the present invention.

In some embodiments, the system for analysis may comprise
a device according to the first aspect,
a source of a carrier gas, which is gasiously connected to the chamber via the inlet capillary, such as a a source of carrier gas further comprising a controller enabling controlling the source of carrier gas so as to control the flow of carrier gas through the inlet capillary channel.

Beneficially, there may be provided a substantially gas tight connection between the chamber and the analysis instrument.

Additionally or alternatively, the system may have a characteristic time, corresponding to a time difference between a. a change in the associated liquid sample, such as a sudden increase the level of dissolved species, such as the electrochemical formation of hydrogen as seen in the electrochemistry example below, and b. a point in time wherein a corresponding signal change as measured by the analysis instrument reaches 1/e with respect to a saturation level of said signal, is 1 minute or less, such as 45 seconds or less, such as 30 seconds or less, such as 15 seconds or less, such as 10 seconds or less, such as 5 seconds or less, such as 1 second or less. The characteristic time is dependent on the diffusion time of the species in the liquid to reach the membrane, and the transportation time through the extraction device. Compared with hitherto known and comparable analysis systems, this could represent a significant improvement.

Results obtained by the inventors have so far also indicated that a sensitivity in order of $10^{+9}$ species per second, or higher, could be provided in some experimental situations.

In a third aspect, the invention relates to a method for extracting a volatile species from an associated liquid sample, the method comprising:

a. providing a device according to the first aspect or a system according to the second aspect,
b. exposing the membrane to the liquid sample,
c. allowing the volatile species to pass through the membrane.

In one embodiment, the method for extracting a volatile species from an associated liquid sample may comprise, at least partially, immersing the device according to the first aspect so as to realize exposing the membrane to the liquid, preferably the liquid sample being an aqueous liquid, such as the liquid sample being water.

In a fourth aspect, the present invention relates to the use of a device according to the first aspect, or a system according to the second aspect, for extracting a volatile species from a liquid sample.

The individual aspects of the present invention may each be combined with any of the other aspects. These and other aspects of the invention will be apparent from the following description with reference to the described embodiments.

BRIEF DESCRIPTION OF THE FIGURES

The extraction device and the analysis system according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
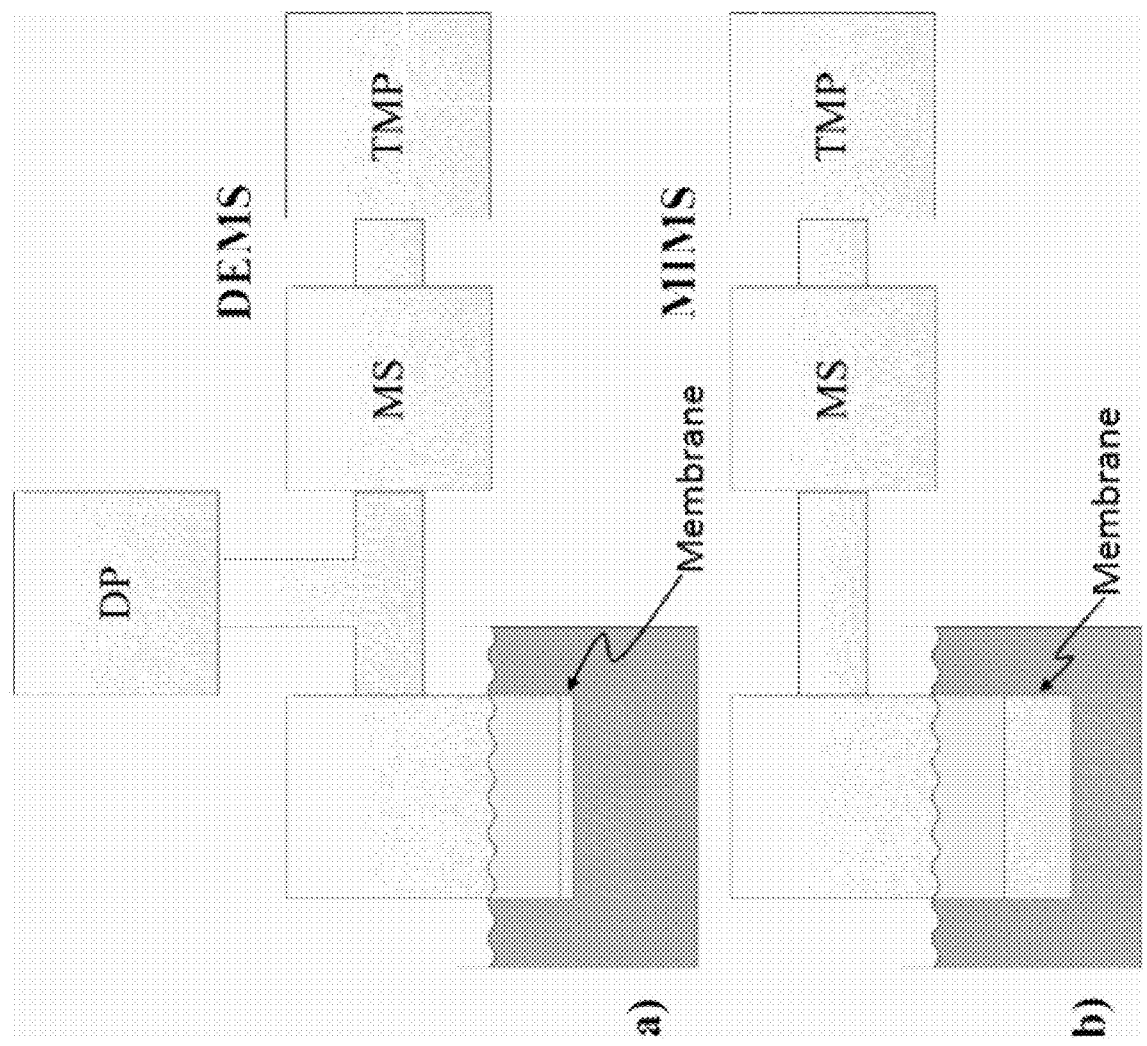
FIG. 1 shows two schematic cross-sectional drawings of a differential electrochemical mass spectrometry (DEMS), and a membrane inlet mass spectrometry (MIMS), respectively, known from the prior art.
Figure 2:
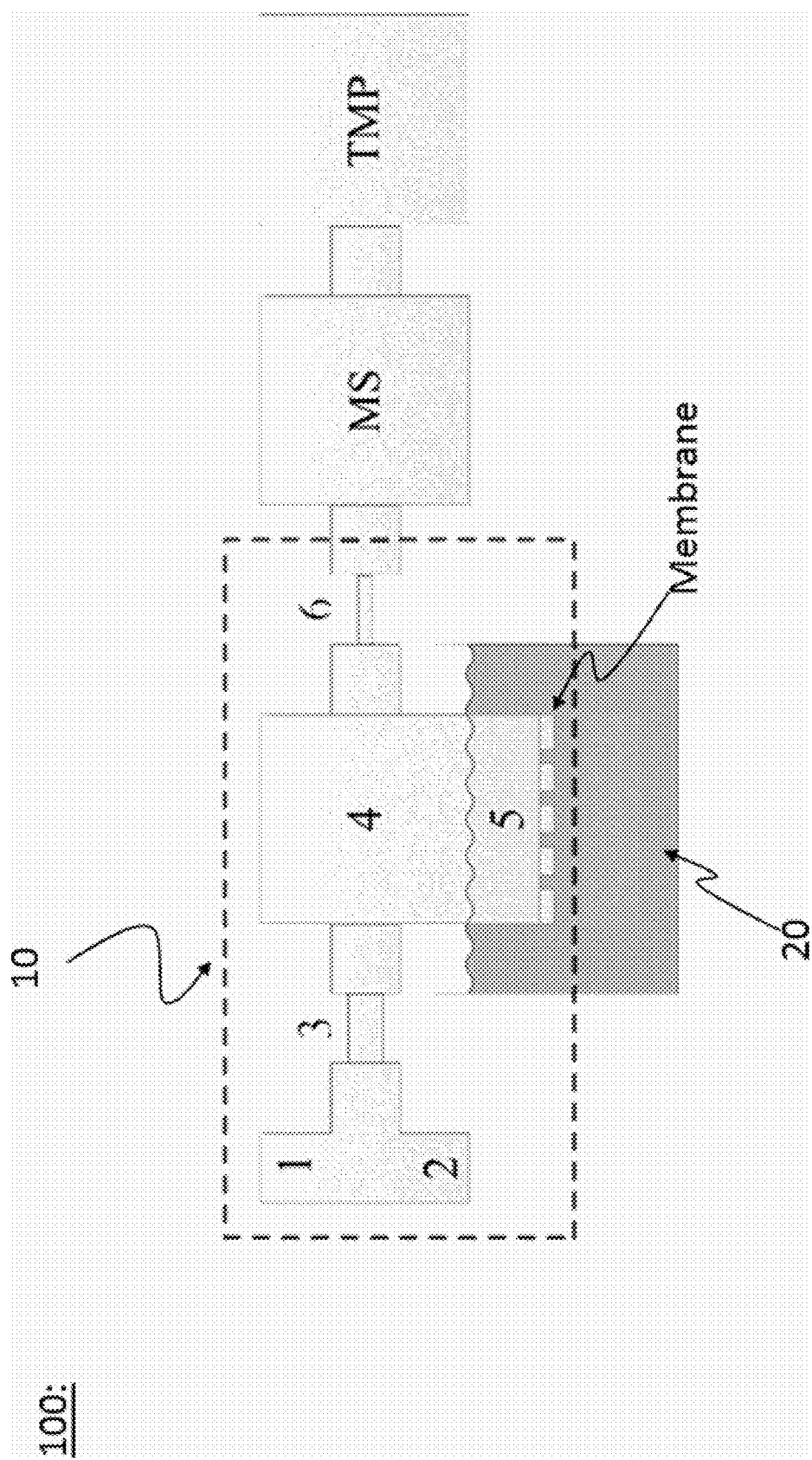
FIG. 2 shows a schematic cross-sectional drawing of the extraction device and a corresponding analysis system according to the present invention.

FIG. 2 shows a schematic cross-sectional drawing of the extraction device 10 and a corresponding analysis system 100 according to the present invention.

The concept of the extraction device, or so-called 'sniffer-chip', is schematically shown in FIG. 2 and goes as follows: An carrier gas, preferably an inert carrier gas such as helium, argon etc., is let in through the carrier gas inlet 1 after which most of it flows directly out again through a pressure controller outlet 2. The remainder of the carrier gas flows through a restricting channel section 3, which increases the flow-velocity and thereby prevents back-diffusion from the following chamber 4. This part of the carrier gas flows through a low volume gas-chamber 4 underneath a perforated and preferably hydrophobic membrane 5, which supports a liquid-gas interface.

The absolute pressure in chamber 4 is maintained at, or very near, the ambient pressure in the liquid using the pressure controller 2, to prevent collapse of the liquid-gas interface. Thereby it is able to support a large liquid-gas interface area, across which volatile species can evaporate. Due to the partial pressure difference across the liquid-gas interface, the carrier gas is continuously saturated with analyte from the liquid 20, being them either liquid or gaseous species, and naturally vapour from the solvent itself. From the chamber 4 the carrier gas, now saturated with measurable species, flows through a narrow capillary channel 6, over which a pressure drop from about 1 bar (ambient pressure) to $<10^{-6}$ mbar occurs. The saturated carrier gas is then let directly to a MS for detection. It is important that the gas chamber 4, and the downstream gas channels for that matter, has a small internal volume in order for the residence-time of the atmospheric pressure part of the system to be kept at a minimum. After the capillary channel 6, the gas flow can be assumed to be ballistic (free molecular flow) and hence very fast as will be explained in more detail below.

Figure 3:
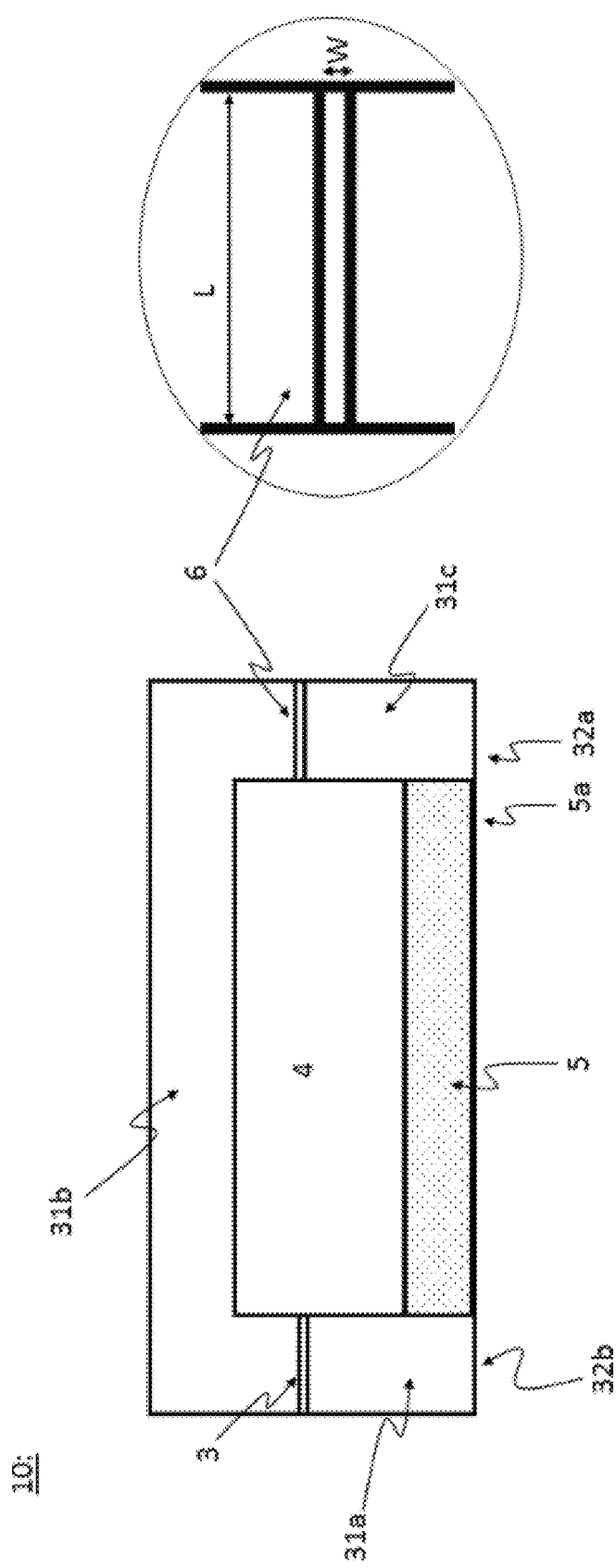
FIG. 3-5 shows various schematic cross-sectional drawings of the extraction device according to the invention.

FIG. 3 shows in more detail a schematic cross-sectional drawings of an extraction device 10 according to the invention. The device 10 for extracting volatile species from an associated liquid (20 in FIG. 2), such as a volatile sample, is suitable for connection to an inlet of an analysis instrument (not shown here for clarity), such as a mass spectrometer, the device also comprises a chamber 4, and a membrane 5, such as a perforated membrane as schematically indicated, which connects the inside of the chamber 4 with the outside of the chamber. The membrane 5 also forms a barrier for the liquid (not shown) at zero, or near-zero, differential pressure between the inside and the outside of the chamber, but allows passage of the volatile species at zero, or near-zero, differential pressure between the inside and the outside of the chamber. The chamber comprises surrounding walls 31 substantially impermeable to the relevant gasses. It will be understood by the skilled person that 'differential pressure' here refers to the absolute pressure difference, not the partial pressure of the various species. The difference in the absolute pressure should generally be kept low to avoid breakdown of the membrane, whereas the differential partial pressure of for example species, or analyte, should generally be large to facilitate migration across the membrane. The term of near-zero differential pressure may be considered in the context of the present invention to include a pressure difference of up to 10 mbar, 100 mbar, 200 mbar, or 1000 mbar.

The device 10 also comprises an inlet capillary channel 3 which connects the inside of the chamber with the outside of the chamber, the inlet capillary channel being arranged for intake of a carrier gas, such as an inert carrier gas, e.g. He. As mentioned above the inlet channel should preferably be designed in combination a high incoming flow-velocity and so as to prevent back-diffusion from the following chamber 4. Thus, the length and cross-sectional dimensions of the inlet capillary channel 3 should be designed accordingly.

The device 10 further comprises an outlet capillary channel 6 which connects the inside of the chamber with the outside of the chamber, the outlet capillary channel being arranged for connection with said inlet of the associated analysis instrument (not shown here), and after the capillary channel 6, the gas flow out of the chamber can be assumed to be ballistic (free molecular flow) or near-ballistic i.e. with a high mean free path compared to the dimensions of the analysis instrument and the fluid connection thereto.

The extraction device 10 is further arranged so that upon immersion of the device into the liquid (not shown, see FIG. 2), the device allows the liquid to come into contact with the membrane 5 i.e. directly without no need for pressure or suction towards the membrane. The membrane is preferably "liquid-phobic", i.e. hydrophobic for immersion in water or oleophobic for immersion in oils, or maybe even non-porous, the liquid will never breach the membrane and enter the gas chamber unless when forced to do so. Preferably a substantially plane 32a and 32b, such as a plane side, of the device comprises the membrane, and wherein an outer surface 5a of the membrane is substantially flush, such as flush, with said side of the device 32a to facilitate easy fluid contact to the membrane.

In an alternative embodiment, the membrane surface 5a could be protruding outwards relative to the surface 32a and 32b of the device to yield better liquid contact.

In the right exploded view in FIG. 3, there is shown an enlarged view of the outlet capillary channel 6 having length L and width W, or height H (for a circular shape the width W is the diameter, for a cross-sectional quadratic shape the height H i the relevant dimension etc.). The ratio between L and W (or H) should generally be large, preferably L/W (or L/H) being at least 100, more preferably at least 50, most preferably at least 25, for typically working conditions, though it also depends on the specific pressure inside the chamber 4 and the desired pressure before analysis in the analysis instrument (not shown). In some embodiments, the capillary outlet channel 6 provides an appropriate pressure reduction i.e. a pressure reduction factor of approximately $10$, $10^2$, $10^3$, $10^4$, $10^5$, $10^6$, $10^7$, $10^8$, $10^9$, $10^{10}$, $10^{11}$, or $10^{12}$.

In an alternative embodiment not shown here, the capillary outlet channel 6 could be an orifice having similar length to width ratio as long as the channel can provide an appropriate pressure reduction before the analysis instrument, e.g. a pressure reduction factor of about $10^7$, $10^8$, $10^9$, $10^{10}$, $10^{11}$, or $10^{12}$.

As mentioned above, the device 10 has a chamber where the internal volume of the chamber is 1 ml or less, preferably 100 nl or less, more preferably less than 50 nl, alternatively less than 25 nl, preferably such as 8.5 nl or less, such as 8.5 nl. It will be explained below that the chamber may be subdivided in to one or more cavities. The skilled person will recognised that the time response of the extraction device 10 is roughly dependent like a proportionality between the inner volume of gas (between the inlet and outlet capillary channels) divided by the flow rate, thus generally the inner volume should be kept low but may be compensated by a larger flow rate. The flow rate is in turn limited by the pressure limit of the analysis instrument with a working pressure of typically $10^{-6}$ mbar. Depending on the pumping system associated with this instrument a higher flow rate leads to a higher pressure.

The analysis instrument could be a mass spectrometer, but optically, micromechanically and acoustically based analysis systems could also be implemented within the context of the present invention, e.g. Cavity ring-down spectroscopy (CRDS), Photoacoustic spectroscopy, or MEMS resonator.

Figure 4:
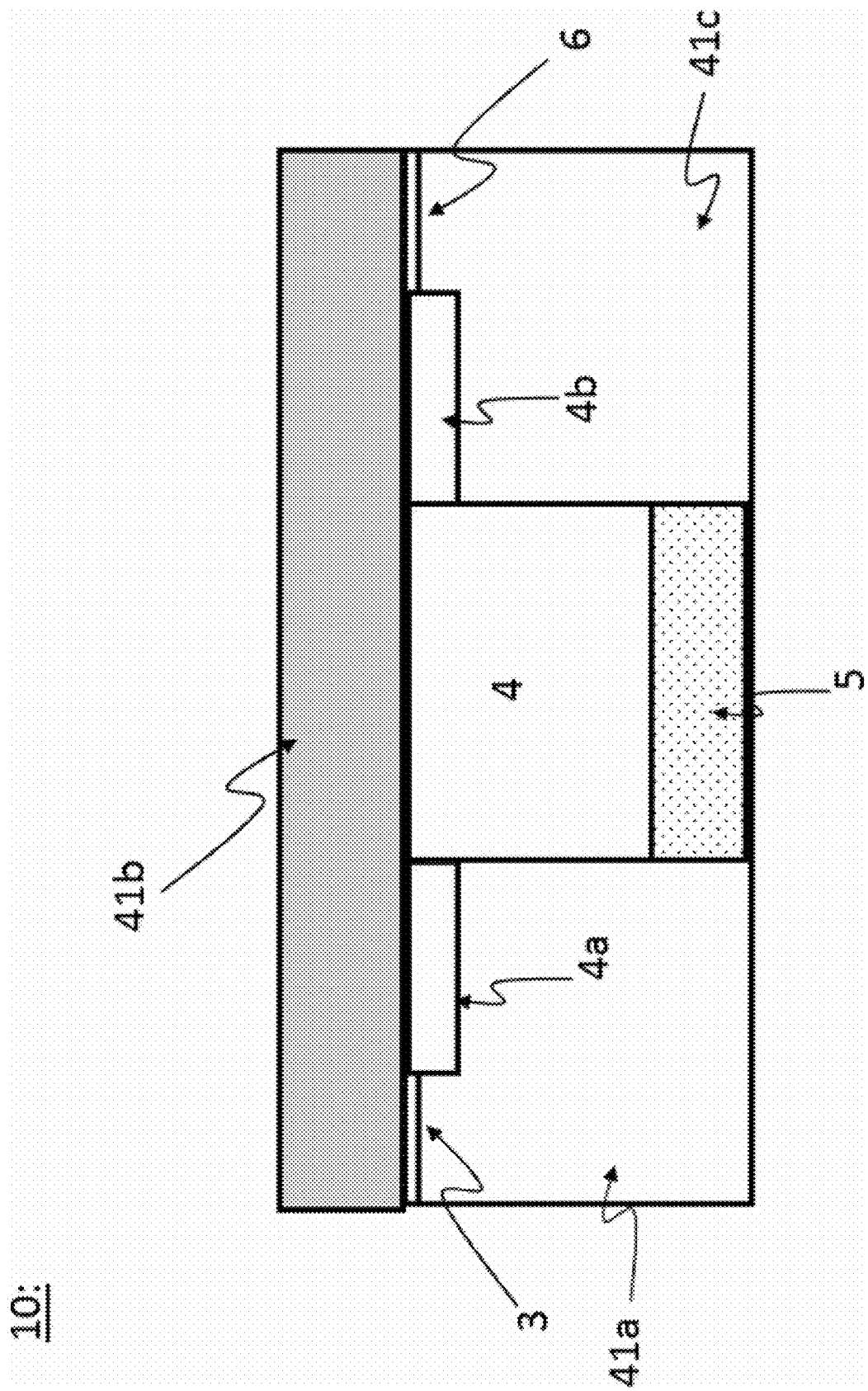

FIG. 4 shows another schematic cross-sectional drawings of the extraction device 10 according to the invention similar to FIG. 3. In this embodiment, additional cavities 4a and 4b connect the chamber 4 with the inlet 3 and outlet 6 capillary channels, respectively. The drawing is schematically showing the chamber 4 as being somewhat larger than the cavities (at least in this cross-sectional view) but the cavities 4a and 4b may also be larger than the chamber 4. As mentioned above, the chamber could also be seen as a more extended chamber comprising both cavities 4a and 4b in addition to the chamber 4 immediately above the membrane 5, especially when discussing the internal volume.

In FIG. 3, the upper part of the surrounding wall 41b could be a glass (e.g. Pyrex) section bonded to the other walls 41a and 41c of the extraction device 10. This is advantageous because channels 3 and 6, cavities 4a and 4b and the chamber 4 may then for example be manufactured, e.g. etched, in one entity which then be closed with the top wall 41b. In the context of the present invention, the parts 41a and 41c of the extraction device forming the chamber, cavities and inlet and outlet can be considered a first structural element, whereas the top section 41b can be considered a second structural element.

Figure 5:
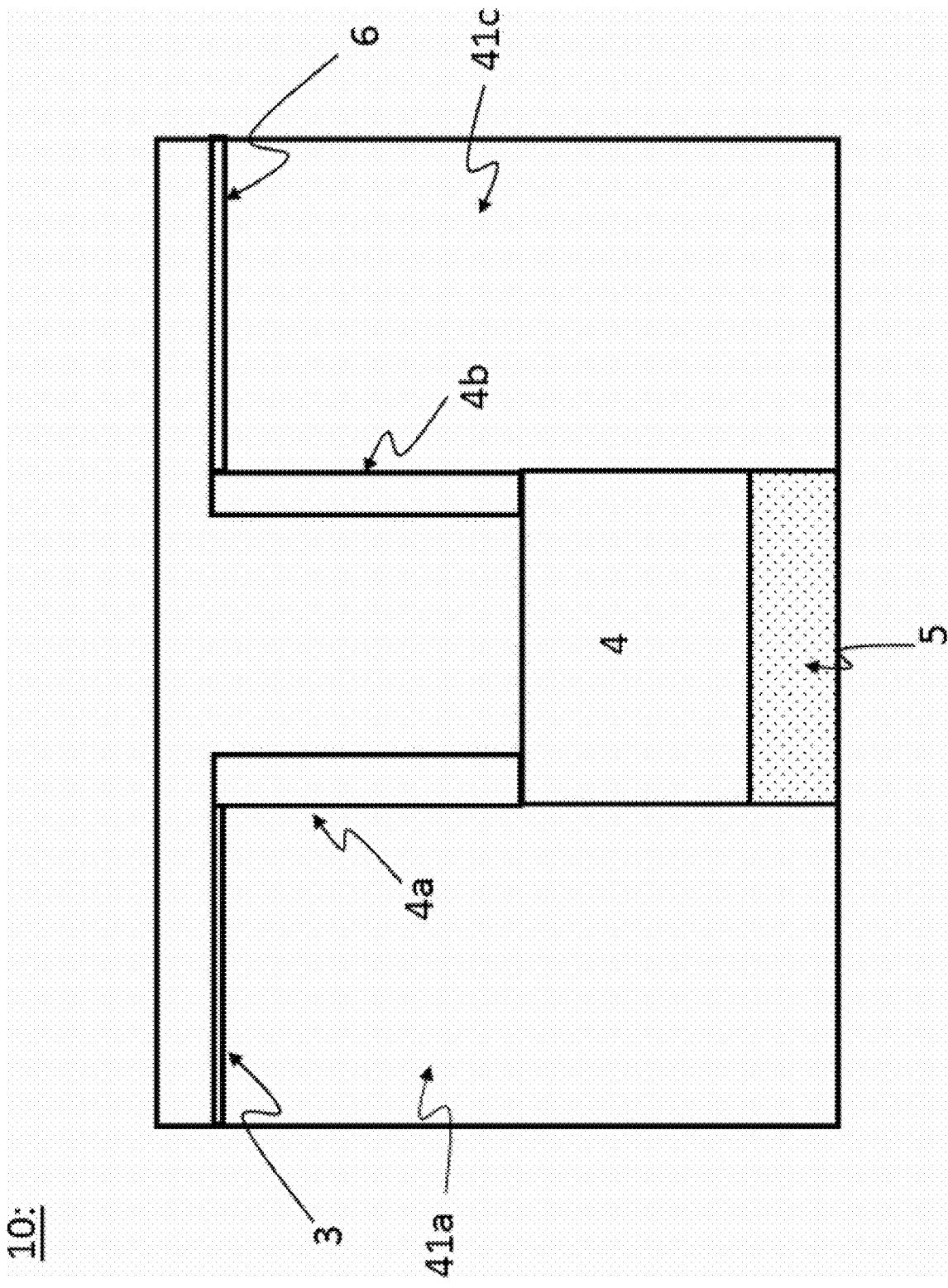

FIG. 5 shows another schematic cross-sectional drawings of the extraction device 10 according to the invention similar to FIG. 4, but where the cavities 4a and 4b connected to the chamber 4 extend in an orthogonal direction relative to the plane of membrane 5 i.e. further away from the liquid sample (not shown). This may be beneficial for increased space for the fluid connections with the inlet carrier gas and outlet channel to the corresponding analysis apparatus (also not shown here).

Figure 6:
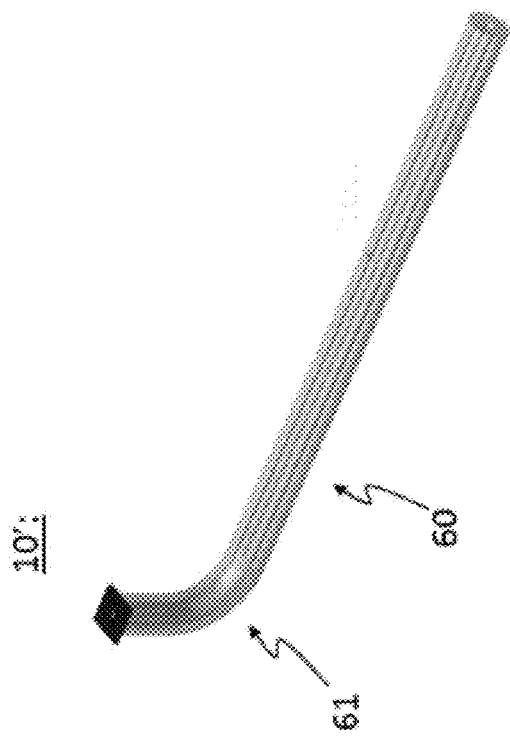
FIG. 6 shows perspective drawings of two extraction devices according to the present invention.
Figure 6:
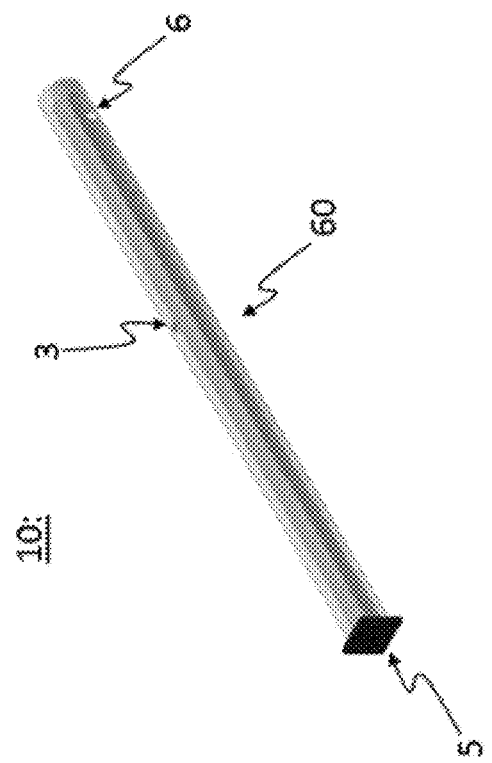

FIG. 6 shows perspective drawings of two extraction devices 10 and 10' similar to the embodiment of FIG. 5, but where the cavities 4a and 4b extends inside an elongated tube 60, e.g. manufactured as a glass 'stick'. Inlet channel 1 and outlet channel 6 are positioned at opposing end relative to the membrane 5 and chamber positioned behind the membrane 5. The extraction device 10' in FIG. 6B differs from the device 10 shown in FIG. 6A in that the elongated tube has a bend section 61. The elongated and specially designed structure of the extraction device 10 and 10' may be advantageous for various extraction applications where the analysis instrument is remotely positioned relative to the sampling area with the liquid. However, other designs of the extraction devices are readily implemented by the skilled person once the teaching and principle of the present invention is comprehended. Thus, the extraction device could have an overall planar and quadratic design, or an overall cubic shape, etc.

Figure 7:
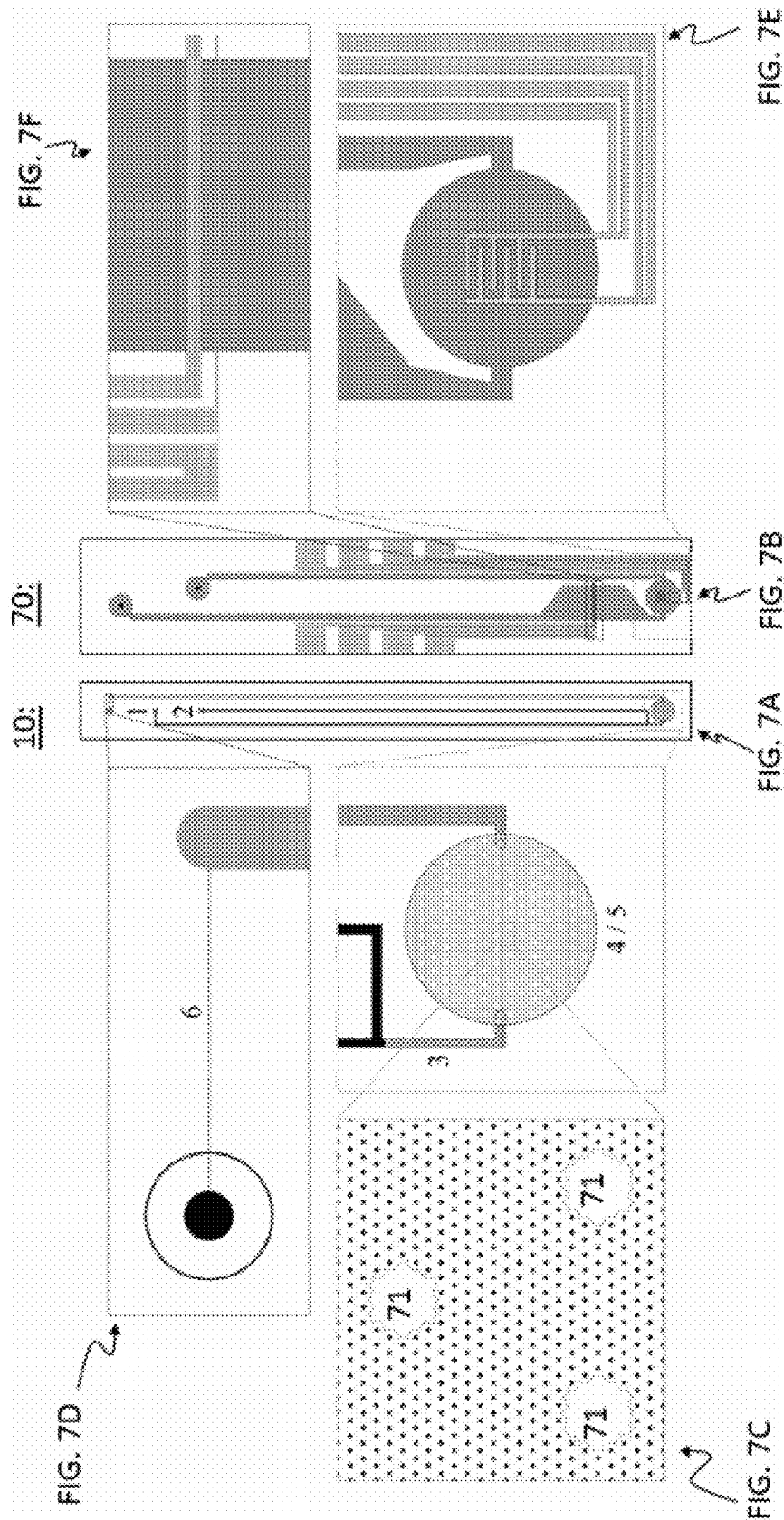
FIG. 7 is an schematic overview of an extraction device and electrode-chip according to an embodiment of the present invention with various magnified sections.

FIG. 7 is an schematic overview of an extraction device 10 according to an embodiment of the present invention with various magnified sections of a specific embodiment of the present invention. In this embodiment, the device 10 is combined with electrode-chip shown to the left in FIG. 7B.

Figure 8A:
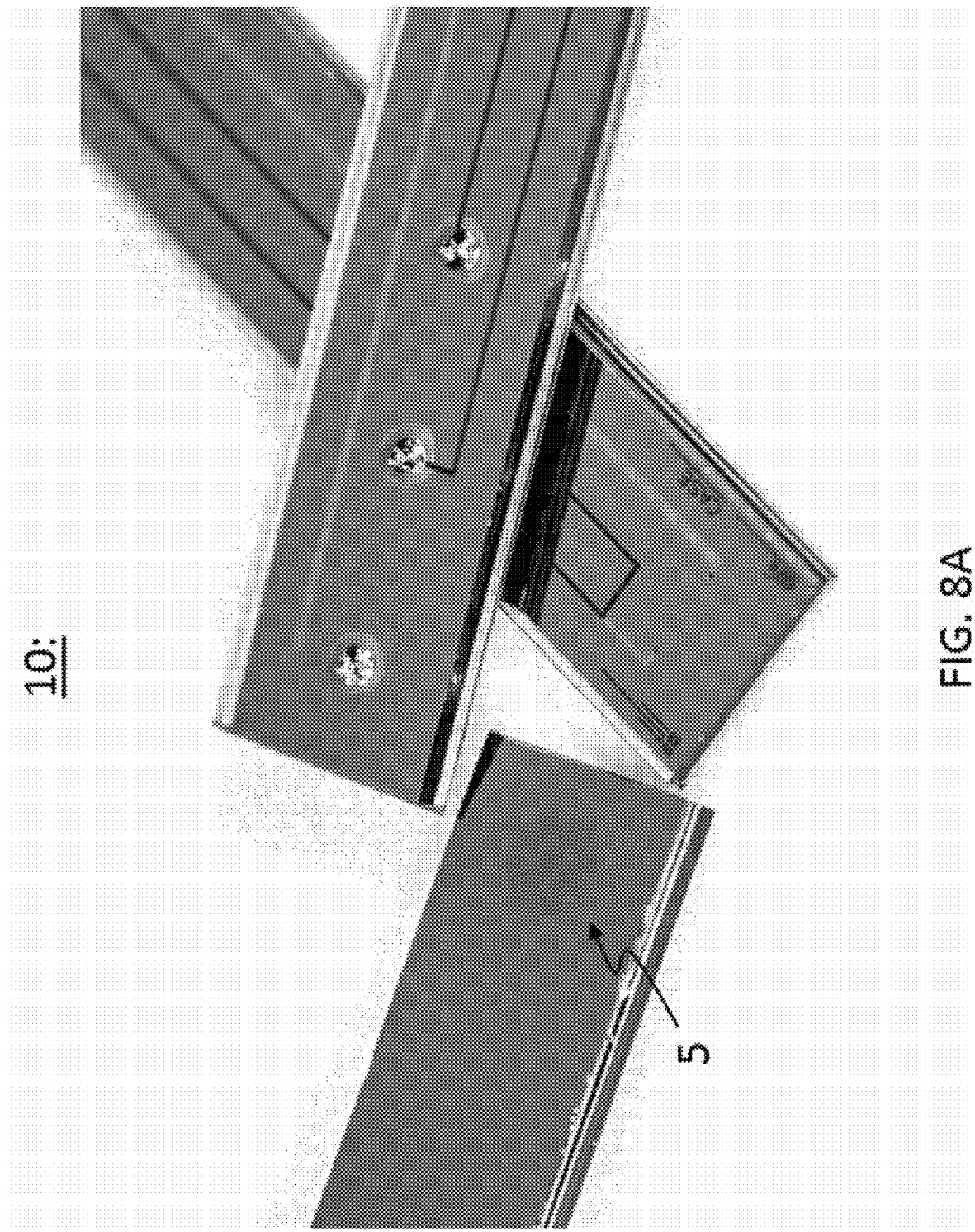
FIG. 8 shows two photographs of the extraction device together with layout of an electrode-chip.
Figure 9:
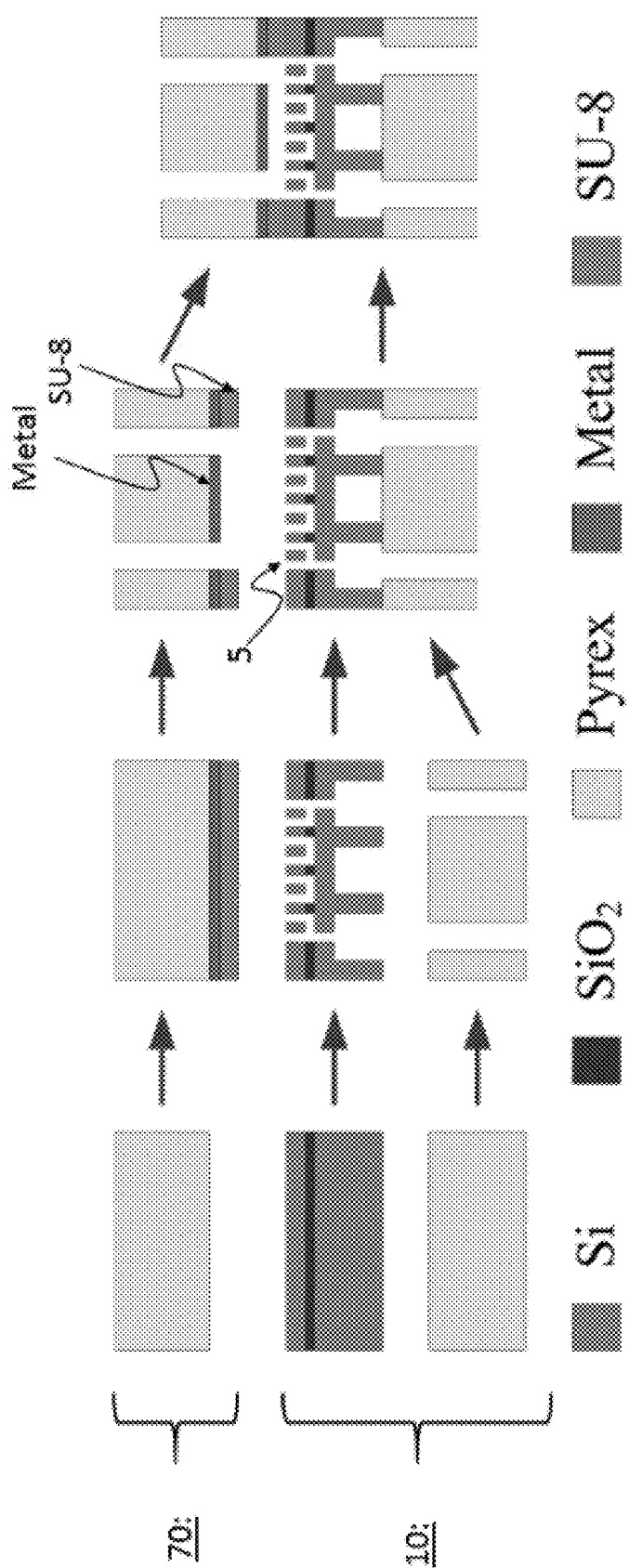
FIG. 9 is a simplified process flow for the extraction device and electrode-chip of FIGS. 7 and 8.

The practical realization of the extraction device 10 or 'sniffer-chip' concept is a micro-fabricated silicon chip made by mostly standard clean room techniques. The primary reason for this, is to make it easy to fabricate all parts of the system in a well-defined and simple manner and to keep the internal volume of the pre-vacuum gas system small, the importance of which was mentioned above. Thus all parts enclosed by the dotted box in FIG. 2 are made in a one silicon chip design. In FIG. 7a an illustration of the sniffer chip is shown in a projected view, with both front- and backside overlaid. In FIG. 8A a photograph of three sniffer-chips is shown, where the three chips are stacked and placed so that one chip (left) shows the membrane 5, one chip shows the gas channels on the backside and one chip (top) shows the three interfacing holes. In FIG. 9 a simplified fabrication process flow for the sniffer-chip is shown together with an electrode-chip 70 that will be described below. Following the bottom part of this process flow, helps understanding how inlet and outlet gas channels, cavities and chamber 4 are connected inside the sniffer-chip.

The sniffer-chip is made from a 100 mm silicon on insulator (SOI) wafer with a 15 μm device layer, a 3 μm oxide layer and a 330 μm handle wafer. The membrane is defined in the device layer co-planer with the chip surface and all gas channels are defined on the backside of the chip in the handle wafer. All structures, including the holes perforating the membrane, are etched using deep reactive ion etching (DRIE). The membrane is released in a timed wet hydrofluoric acid (HF) etching process that removes the underlying oxide layer under part of the perforated membrane, but leaves an array of supporting oxide pillars for improved mechanical stability. In this fashion a fully connected 3 μm tall gas-chamber is formed below the membrane. The gas channels on the backside and the gas chamber beneath the membrane, are connected with two through-holes, also formed in DRIE. The gas channels on the backside are sealed off with a Pyrex wafer using anodic bonding. Three through-holes are drilled in the Pyrex with a laser in order to interface with the gas channels. Finally the front side of the sniffer-chip, i.e. the membrane, is coated with perfluorodecyltrichlorosilane (FDTS, CAS:78560-44-8) using molecular vapour deposition (MVD) to make it hydrophobic. The layout of the gas channels, cavities and chamber, and the actual interfacing with a macroscopic gas handling system is similar to that used in the so-called μ-reactor, which was developed in the inventor's research group in 2009, cf. Reference 3. Following the illustration in FIG. 7A, with the schematic in FIG. 2 in mind, the design and function of the sniffer-chip 10 goes as follows: The carrier gas is let in trough inlet channel 1 and downward through a 40000 μm long and 100 μm wide channel to a Y-crossing. The main part of the carrier gas is then let out to the pressure controller 2 through a similar channel, while the remainder of the gas flows through a narrow inlet restricting channel 3 section towards the gas chamber 4 underneath the membrane 5. The initial channel system 1-2 acts as an on-chip pressure regulated carrier gas reservoir and is etched to a depth of 225 μm-250 μm to ensure low pressure drop even at high flow-rates. This gas flow is of the order 1-10 ml min$^{-1}$ and ensures a short residence time in the external gas control system and a flow-rate in a range controllable with standard mass flow controllers (MFC).

Illustrated by the zoomed view of the chamber and membrane '4/5' overlaying each other in the view angle in FIG. 7A, a small fraction of the carrier gas is the lead from the Y-crossing through a 1500 μm long and 100 μm wide channel 3. This channel section, as well as the remainder of the channel system on the backside of the sniffer-chip, is etched to a depth of 3 μm. In this channel section in particular, the small cross-section ensures a high flow velocity and thereby a minimal back-diffusion from the gas chamber 4. From here the carrier gas is lead through an approximately 300 μm long through-hole with a diameter of 100 μm to the other side of the sniffer-chip to the gas-chamber 4, which has a diameter of 2000 μm and a height of 3 μm given by the thickness of the buried oxide layer. The perforation of the under-etched membrane is about 7.3% and the holes are 3 μm in diameter placed in a honeycomb mesh. To ensure mechanical stability of the membrane, it is supported under about 10% of its area by silicon dioxide support pillars 71 with a diameter of ca. 50 μm. The support pillars are formed by careful timing of the HF etch for releasing the membrane 5. The final etching front is marked by a dashed line in the enlarged view in FIG. 7C and the resulting volume of the under-etched gas chamber 4 is about 8.5 nl i.e. without the connecting channels.

Figure 10:
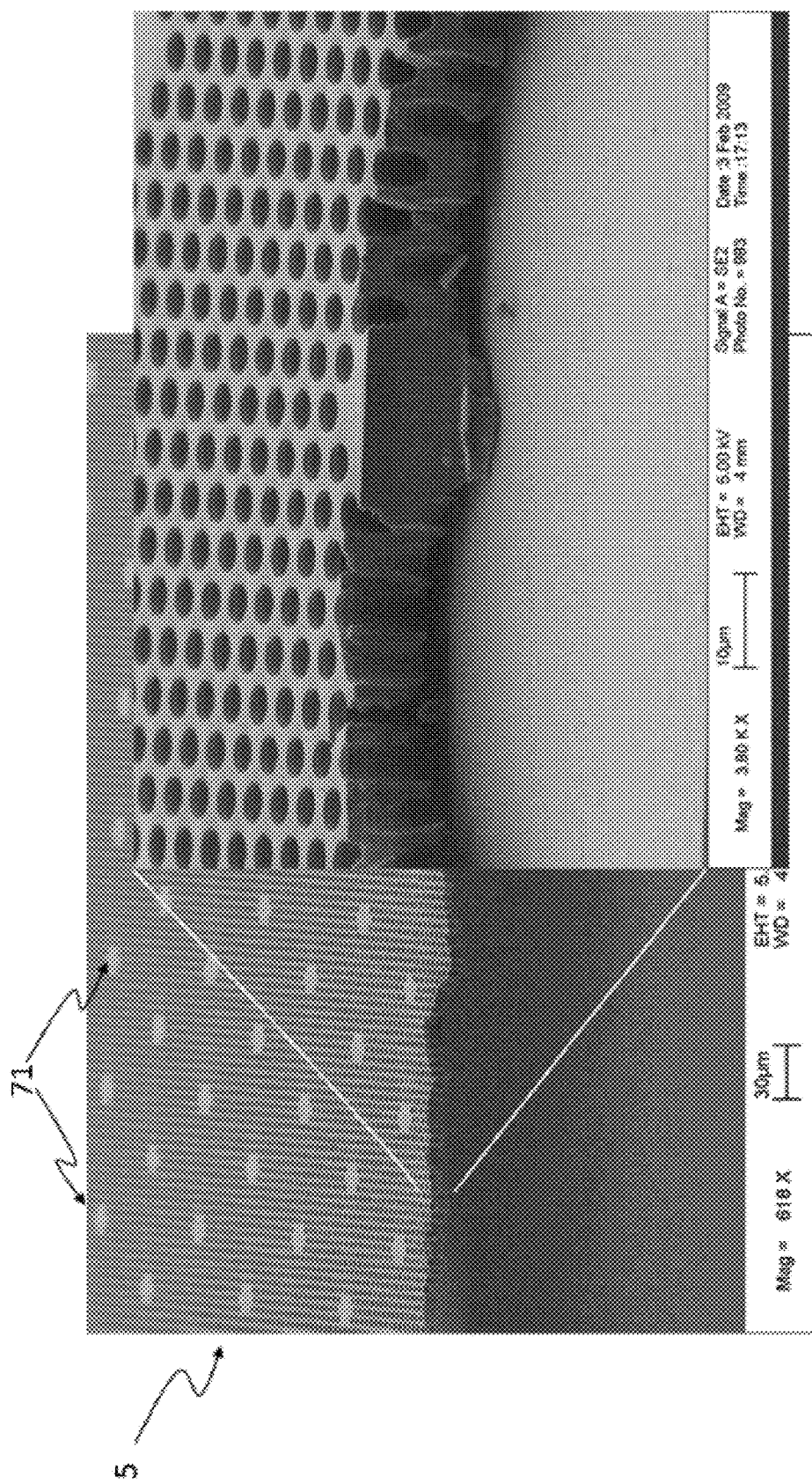
FIG. 10 is a SEM micrograph of the membrane of the extraction device in the embodiment of FIGS. 7 and 8.

A SEM micrograph of the perforated membrane after release etch is shown in FIG. 10.

The FDTS treated silicon surface has a water contact angle of about 110° at room temperature and the FDTS coating covers all surfaces of the chip, including top and bottom surfaces of the membrane as well as the perforation holes. Using the dimensions of membrane holes the curved liquid gas interface can be expected to support a pressure difference of ca. 33 kPa before bursting.

After the gas chamber 4, the carrier gas is once again lead out through a vertical through-hole to the backside of the sniffer-chip, where a 48000 μm long and 200 μm wide channel leads it to a narrow capillary 6 at the top of the sniffer-chip as seen in FIG. 7D, being an enlarged view from FIG. 7A. The long channel section is made wide as a compromise between minimal flow resistance and minimal volume, and thereby minimal residence time. It is desired, that the flow-rate is controlled by the capillary channel 6 at the end. The capillary is about 1000 μm long and has a cross-section of 5 μm by 3 μm. The pressure drop across this capillary alone is practically of the order 1 atm. resulting in a pressure on the backside of the capillary of the order $10^{-6}$ mbar. Thus it is possible to connect the sniffer-chip directly to a MS. The total internal volume of the sniffer-chip after, and including, the gas chamber 4 is about 31 nl and the flow-rate through the capillary to the MS is about $1.5 \times 10^{15}$ molecules s$^{-1}$ or about 60 nl s$^{-1}$ with atmospheric pressure inside the chip. This results in about 0.66 s residence time of the sniffer-chip, which gives the chip an almost instant time-response and since the capillary outlet allows the chip to be coupled directly to a MS, no compromise is made in terms of sensitivity. Another benefit from this system is that the membrane treats all species equal in contrast to the MIMS membrane, which is preferential towards some species. Also, much less solvent evaporates into the analyte stream in sniffer-chip, since the carrier gas saturates at the vapour pressure of the solvent and solvent transfer is in the worst case limited to vapour pressure equilibrium.

Figure 8B:
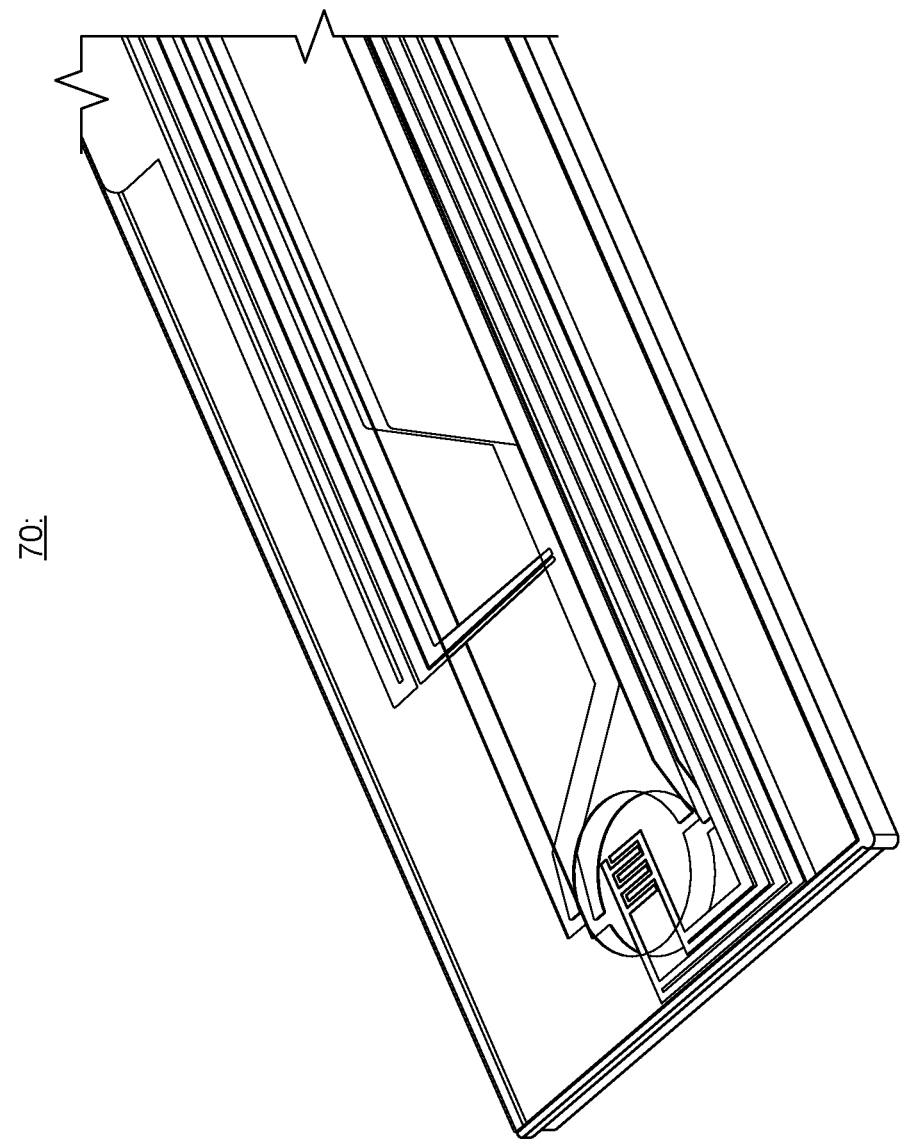

Below more details about the electrode-chip 70 will be given, the chip 70 serving the purpose as an illustrative application of the present invention within electrochemistry:

With the membrane 5 of the sniffer-chip 10 exposed to ambient and with the elongated design of the chip, it is easy to dip the sniffer-chip into an aqueous solution and measure any volatile species dissolved in it. This approach can be applied to interface the sniffer-chip with an electrochemical cell and measure products evolved at the working electrode. However, it may be difficult to quantify the product formation in a reproducible manner, since the distance between the working electrode (WE) and the sniffer-chip membrane is ill defined. It is also difficult to get the sniffer-chip in close enough proximity to the WE to collect all products. As a result the bulk electrolyte may saturate, which results in a drifting background signal. Therefore, in order to make quantifiable benchmark measurements with the sniffer-chip and add-on electrode-chip was developed. The electrode chip comprises electrodes and fluidic channels for the electrolyte. Together with sniffer-chip the electrode-chip thereby forms an enclosed two-chip assembly giving full control of the electrochemical environment. In FIGS. 7B and 8B a schematic illustration and a photograph of the electrode-chip are shown respectively. Once again FIG. 9 show a simplified fabrication process flow of the sniffer-chip 10 together the electrode-chip 70, which in the final panel also illustrates how the completed assembly looks.

The electrode-chip 70 is a Pyrex chip with metal electrodes deposited using e-beam evaporation in a 200 nm thick layer and patterned with standard UV lithography. On top of the electrode pattern a 100 μm thick SU-8 film is spun on and a channel system is the defined in the SU-8 film by UV lithography. Inlet and outlet holes are made through the Pyrex using a CO2 laser after electrode deposition and SU-8 processing. By clamping the electrode-chip onto the sniffer-chip, the channels defined in SU-8 are sealed against the device layer of the sniffer-chip. The electrodes of the electrode-chip are positioned exactly above the membrane at a distance defined by the thickness of the SU-8 layer, in this case 100 μm. The electrode-chip design used here is a simple SU-8 channel system, which brings the electrolyte through 500 μm wide channels to and from a liquid chamber with a diameter of 3000 μm aligned above the sniffer-chip membrane of 2000 μm in diameter. The metal electrodes are defined in a double comb pattern as seen in FIG. 7E, being an enlarged view from FIG. 7B. The wires are 100 μm wide and 100 μm apart and the total wetted area of each wire is 0.44 mm². Upstream from the double comb electrodes another 100 μm wide electrode is defined, crossing a 3000 μm wide channel section as seen in FIG. 7F, also being an enlarged view from FIG. 7B. The thinner electrodes defined in the wide channel section are made as an attempt to make a controlled hydrogen reference electrode, which is not used in this study. By applying a potential across the two double comb electrodes, or between the double comb electrodes and the upstream electrode, a range of simple two electrode-experiments can be performed, as will be described in further details below.

In order to calibrate the sniffer-chip 10, it is important to know the exact molecular flow-rate through the capillary of the sniffer-chip. By matching the QMS signal with this flow-rate using independent calibration measurements of various gas compounds, it can be converted into a measure of the composition of the molecular flow and thus the molecular flow-rate of each compound. The molecular flow-rate can be either calculated or measured experimentally, cf. reference 3 for more details.

Calibration constants for every gas measured in the experiments are found by conducting a measurement on a well-defined gas mixture, where the gases in question are mixed into the carrier gas in a small but well-defined amounts. The calibration constant thus comes out as a ratio between the molecular flow-rate and the QMS signal measured and captures differences in ionization probabilities, pumping rates, etc. Thus QMS currents measured with the sniffer-chip can be converted to molecules/s.

To demonstrate the operation of the sniffer-chip 10 electrochemical water-splitting is used as a test reaction. The electrode-chip 70 is interfaced with the sniffer-chip forming an enclosed two-chip assembly as seen in FIG. 7. The electrode-chip has two polycrystalline thin films of Pt with an area of 0.44 mm² each, operating as working electrode (WE) and a counter electrode (CE) respectively. Through the microfluidic channels of the electrode-chip a 0.1 M $HClO_4$ aqueous electrolyte is introduced and held steady during experiments. Thus the two Pt electrodes are located above the sniffer-chip membrane with a 100 μm thin film of electrolyte in between. The electrolyte is automatically completely saturated with He within seconds from the carrier gas flowing under the hydrophobic membrane of the sniffer-chip. Before running the experiment a range of cyclic voltammograms (CV) are run in the potential range of interest until the electrodes are clean and the CVs are stable.

Figure 11:
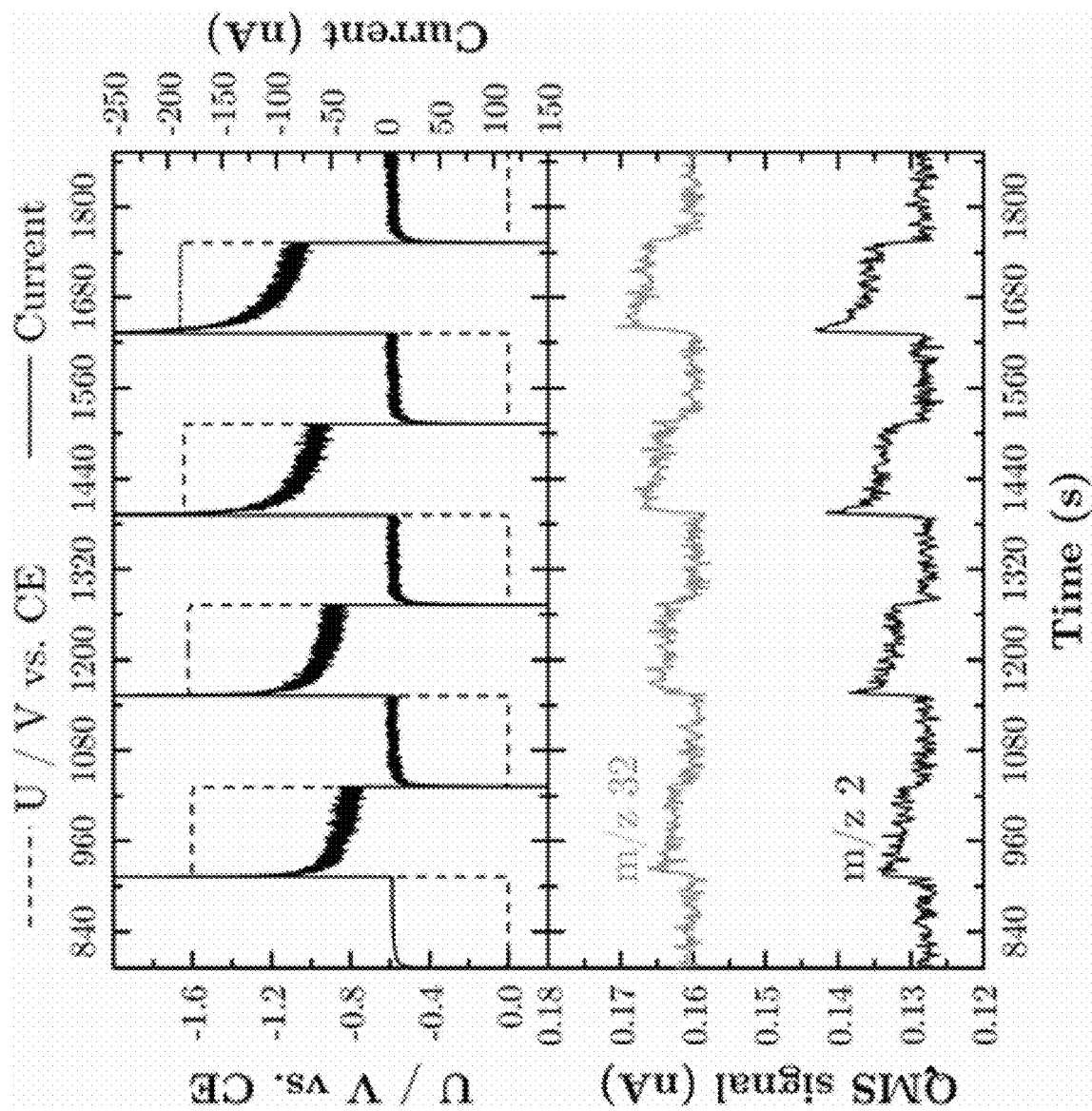
FIG. 11 shows U/V vs. CE and QMS as a function of time in a water-splitting experiment.

The experiment consists of a range of chronoamperometric measurements where a constant potential is applied between the WE and CE for two minutes with two minutes of pause in between. The potential is increased from 1.6 V to 1.8 V with increments of 0.2 V as seen in FIG. 11. The Faradaic current and the QMS signal of the sniffer-chip are logged simultaneously and QMS is set to log the m/z=2 and m/z=32 as representations of hydrogen and oxygen evolution respectively. As seen in FIG. 11, showing raw data from the first four chronoamperometric measurements in the experiment, the QMS signals and the Faradaic current measurement are correlated. There is a slight time delay in the QMS signal, matching the expected diffusion time of hydrogen and oxygen across the 100 μm thin electrolyte film. This can naturally be reduced by reducing the height of the electrolyte chamber.

The lowest absolute current measured is about 50 nA, corresponding to ca. 10 $\mu A\ cm^{-2}$, which is a measure of the sensitivity of the system. The full capability of this particular sniffer-chip would however be realized by having a WE covering the entire membrane area of the sniffer-chip, to utilize the large liquid/gas interface. Thus by normalizing membrane surface area of 3.14 mm² instead of the electrode area about 150 $nA\ cm^{-2}$, indicating the potential sensitivity of this particular sniffer-chip design.

Figure 12:
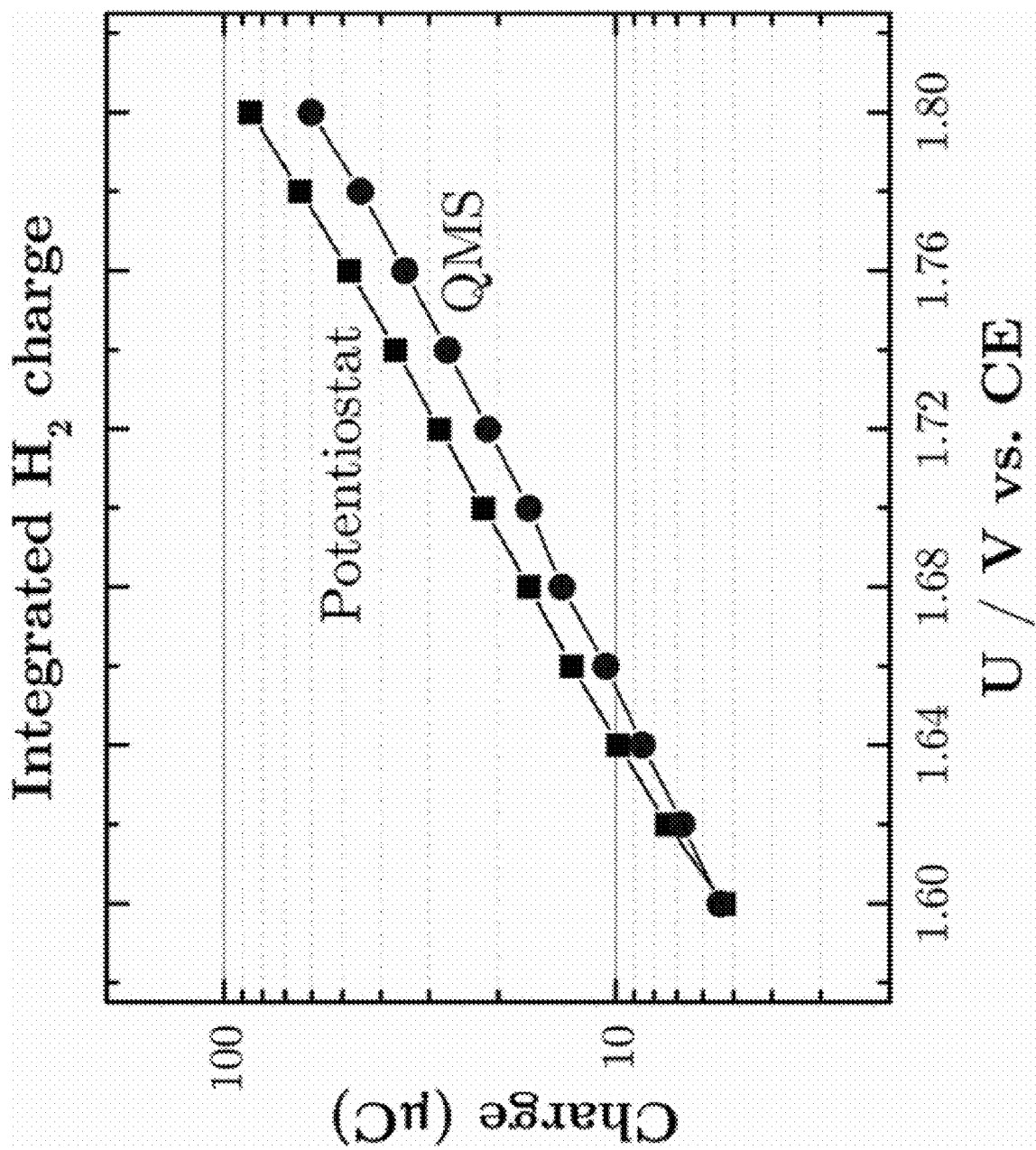
FIG. 12 shows a graph of the measured integrated hydrogen charge.

To quantify the experiment in FIG. 11, the integrated Faradaic current is compared to the integrated QMS signal for each chronoamperometric measurement corrected with calibration constants obtained in an independent calibration measurement. FIG. 12 shows the hydrogen charge measured with the potentiostat (squares) and the QMS (circles), respectively, and these prove to be almost coincident. In the first measurement the QMS signal is slightly higher than the Faradaic current signal, due to noise and for the later measurements the QMS signal starts deviating to lower values, due to back-reaction at the electrodes, i.e. spontaneous hydrogen oxidation over the Pt. The amount $H_2$ accounted for stabilizes at −75% at the end of the experiment. This is due to the electrolyte saturating with H2 after a certain duration of the experiment. Thus in steady state and with this electrode geometry, a ~25% back-reaction is taking place. The oxygen signal would follow the hydrogen signal completely.

In summation, this experiment shows how the sniffer-chip is able to make quantitative measurements of electrochemical products formed at an electrode in situ at absolute current densities as low as ~150 nA cm$^{-2}$. This experiment was done several times and with different chips to illustrate reproducibility.

It is difficult to compare sensitivity and time-response of the sniffer-chip system with literature values since time-response and sensitivity has not been the focus of previous publications. Performing an electrochemical water-splitting experiment at low currents is a clear demonstration of the sniffer-chip system, but in order to establish a proper benchmark of the system a CO-stripping experiment is performed. This is done in the same system as before, but with the two polycrystalline thin film double comb electrodes of Pt both working as WE with a total area of 0.88 mm2. A polycrystalline Pt thin film further upstream is then used as CE. Again 0.1 M HClO4 is used as electrolyte. Before the experiment, the electrodes are again cleaned electrochemically until a stable CV in the potential range of interest is obtained. While holding the potential between WE and CE at about 0.2 V CO is then introduced through the carrier-gas stream for 10 min after which the gas chamber of the sniffer-chip is flushed with pure He for 60 min until no CO is detected and electrolyte is expected to be fully saturated with He once again. The potential is then scanned to 1.2 V at a ramp-rate of 50 mV s$^{-1}$ to oxidize the surface adsorbed CO to CO2, after which a second scan is performed to illustrate, that all CO has been stripped off.

Figure 13:
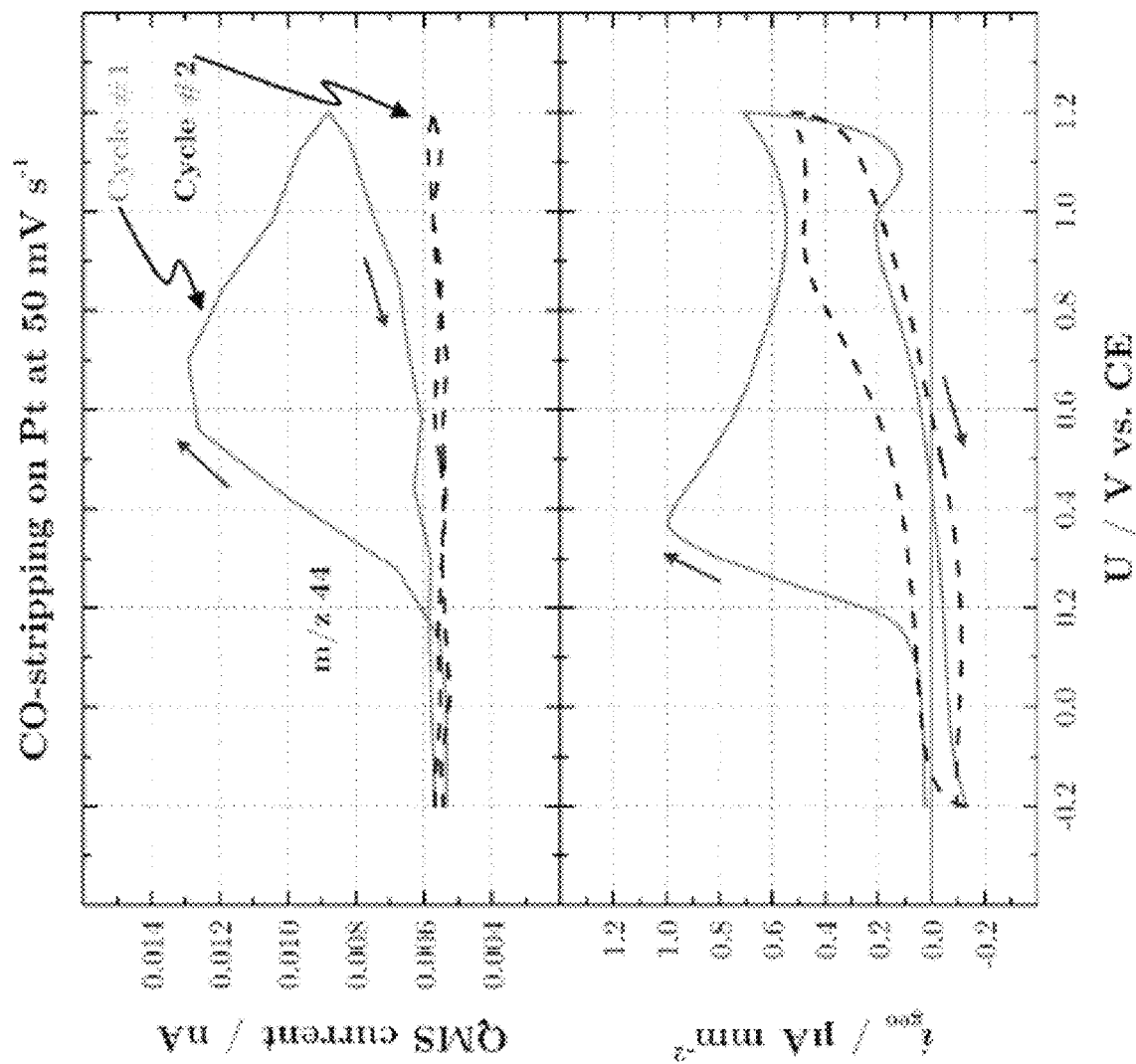
FIG. 13 shows two graphs of a CO-stripping experiment on platinum electrodes benchmarking the sensitivity.

During the experiment the Faradaic current and the QMS signal of m/z=44 representing CO2 are logged simultaneously. In FIG. 13 both the Faradaic current and the m/z=44 QMS signal are plotted as a function of potential and a strong correlation between the two signals is seen. Again there is a slight time delay of the QMS signal as well as a broadening of the CO2 peak due to the diffusion time from the electrode through the 100 µm to the sniffer-chip membrane.

To quantify this CO-stripping experiment, the system is again calibrated as described earlier. The $CO_2$ peak from the QMS signal is integrated, converted into a total number of $CO_2$ molecules and further to the total charge corresponding to that amount. Similarly the Faradaic current peak is integrated and finally a calculation of the expected CO-stripping charge is calculated from the geometrical surface area of the WE assuming a surface roughness factor of 1.2. These three measures of the CO-stripping charge yield an approximate total charge of 4.4 µC.

Thus the sniffer-chip is able to make a quantitative measurement of ~70% of a monolayer being stripped of an electrode with an area of ~0.88 mm$^2$×1.2≈1.06 mm$^2$ (taking roughness factor into account). The signal to noise ratio of this experiment is about 100, so considering this and by again utilizing the large liquid/gas interface of the full membrane area of the sniffer-chip, this particular sniffer-chip design is estimated to be capable of making a quantitative measurement of <1% of a mono-layer electrochemically being stripped off an electrode at a potential scan-rate of 50 mV/s.

Summarizing, the extraction device according to the present invention represents a fast and sensitive method for detecting volatile species in liquids. Using an inert carrier gas flowing underneath a perforated and hydrophobic membrane and through a narrow capillary, the sniffer-chip can couple directly to a QMS, which detects the volatile species collected by the carrier gas, without the use of differential pumping. This results in an intrinsic sensitivity improvement of a factor of ~100 compared to DEMS/OLEMS systems, while maintaining a fast time-response.

With this enclosed two-chip assembly shown in FIG. 7, the user has full control of the electrochemical environment, which makes it possible to analyze the electrochemically formed products quantitatively. Thus the sniffer chip is able to quantify hydrogen and oxygen evolution on a polycrystalline platinum thin film in-situ at absolute Faradaic currents down to ~1 nA and make a quantitative in-situ measurement of <1% of a monolayer electrochemically stripped off an electrode at a potential scan-rate of 50 mV/s. The latter sets a benchmark of the sensitivity of the sniffer-chip system. The sniffer-chip thus represents a new concept for measuring volatile species in liquids. The sniffer-chip is especially relevant for modern research in electro-catalysis, e.g. in the search for sustainable fuels with $CO_2$-reduction, where the electrochemical product distribution varies tremendously with potential and choice of catalyst.

Figure 14:
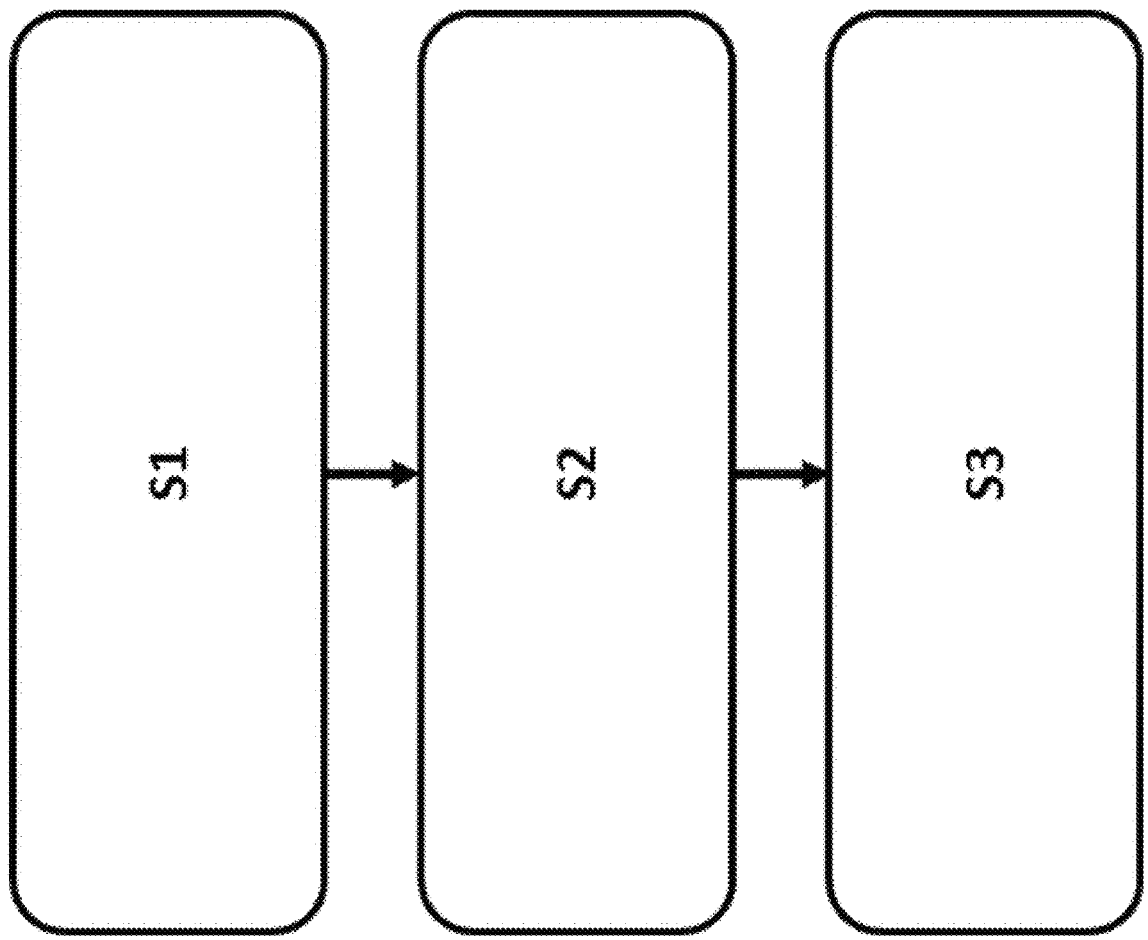
FIG. 14 is a schematic system-chart representing a method according to the invention.

FIG. 14 is a schematic system-chart representing a method according to the invention for extracting a volatile species from a liquid sample 20, the method comprising:
S1 providing a device 10, or a system 100,
S2 exposing the membrane 5 to the liquid sample 20, and
S3 allowing the volatile species to pass through the membrane.

In short, the invention relates to a device 10 for extracting volatile species from a liquid 20 connected to an inlet of an analysis instrument, such as a mass spectrometer (MS). The device has a chamber 4, a membrane 5 forming a barrier for the liquid at zero differential pressure between the inside and the outside of the chamber and allows passage of the volatile species at zero differential pressure between the inside and the outside of the chamber. The device has an inlet capillary channel 3 to feed in a carrier gas and prevent back-diffusion from the chamber, and an outlet capillary channel 6 which provides a significant pressure reduction, e.g. from atmospheric pressure in the chamber 4 to near-vacuum suitable for an MS. The invention combines the best of two worlds, i.e. the fast time-response of a DEMS system and the high sensitivity of a MIMS system, since a differential pumping stage is not needed.

The invention can be implemented by means of hardware, software, firmware or any combination of these. The invention, or some of the features thereof, can also be implemented as software running on one or more data processors and/or digital signal processors.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Annex:
In yet another aspect, the present invention relates to the following 15 embodiments:
1. A device (10) for extracting volatile species from an associated liquid (20) and being suitable for connection to an inlet of an associated analysis instrument, such as a mass spectrometer (MS), the device comprising:
   a. a chamber (4),
   b. a membrane (5), which:

i. connects the inside of the chamber with the outside of the chamber,
ii. forms a barrier for the liquid at zero, or near-zero, differential pressure between the inside and the outside of the chamber,
iii. allows passage of the volatile species at zero, or near-zero, differential pressure between the inside and the outside of the chamber,
c. an inlet capillary channel (3) which connects the inside of the chamber with the outside of the chamber, the inlet capillary channel being arranged for intake of a carrier gas, and
d. an outlet capillary channel (6) which connects the inside of the chamber with the outside of the chamber, the outlet capillary channel being arranged for connection with said inlet of the associated analysis instrument, wherein, upon immersion of the device into the liquid, the device allows the liquid (20) to come into contact with the membrane (5).

2. A device according to any one of the preceding embodiments, wherein a substantially plane side (32a, 32b) of the device comprises the membrane, and wherein an outer surface of the membrane is substantially flush with, or protruding from, said side of the device.

3. A device according to any one of the preceding embodiments, wherein the volume of the chamber (4, 4a, 4b) is 1 ml or less, preferably 1 µl or less, more preferably 100 nl or less.

4. A device according to any one of the preceding embodiments, wherein the outlet capillary channel is spatially dimensioned so that the gas kinetics of the species and the carrier gas, after leaving the outlet capillary channel, can be described as a ballistic flow (Knudsen number significantly above 1), or as a near ballistic flow.

5. A device according to any one of the preceding embodiments, wherein the inlet capillary channel is spatially dimensioned so that limited, preferably no, back-diffusion occurs from the chamber (4, 4a, 4b).

6. A device according to any one of the preceding embodiments, wherein the membrane is perforated.

7. A device according to any one of the preceding embodiments, wherein the device comprises at least
a. a first structural element (41a, 41c), and
b. a second structural element (41b) and
wherein the membrane (5) is formed in the first structural element and on a first side (32a, 32b) of the first structural element, and wherein the second structural element (41b) is joined to the first structural element on the opposite side of the first structural element with respect to the first side.

8. A device according to embodiment 7, wherein one, or more, cavities are formed in the first structural element, wherein one, or more, cavities (3, 4, 4a, 4b, 6) correspond to one or more of
a. the chamber (4, 4a, 4b),
b. the inlet capillary (3),
c. the outlet capillary (6),
and wherein the second structural element (41b) forms a barrier in least one of the one, or more, cavities.

9. A device according to embodiments 7 or 8 wherein one, or more, of
a. the chamber (4),
b. the inlet capillary (3),
c. the outlet capillary (6),
are placed between
the first side of the first structural element (32a, 32b), and
the second structural element (41b).

10. A system (100) for analysis comprising
a device (10) according to any of the previous embodiments, and
an analysis instrument, such as a mass spectrometer (MS),
where the outlet capillary channel (6) of the device is connected with an inlet of the analysis instrument.

11. A system (100) for analysis comprising
a device (10) according to any of embodiments 1-9, and
a source of a carrier gas, which is connected to the chamber via the inlet capillary channel (3).

12. A system (100) according to embodiments 10 or 11, wherein a characteristic time, corresponding to a time difference between
a. a change in the associated liquid sample (20), and
b. a point in time wherein a corresponding signal change as measured by the analysis instrument reaches 1/e with respect to a saturation level of said signal,
is 1 min. or less, preferably 10 s or less, more preferably 1 s or less.

13. A method for extracting a volatile species from a liquid sample (20), the method comprising:
a. providing a device (10) according to any one of embodiments 1-9, or a system (100) according to any of embodiments 10-12,
b. exposing the membrane (5) to the liquid sample (20), and
c. allowing the volatile species to pass through the membrane.

14. A method for extracting a volatile species from a liquid sample according to embodiment 13, wherein the method comprises
at least partially immersing the device according to any one of embodiments 1-9,
so as to realize exposing the membrane to the liquid sample, preferably the liquid sample being an aqueous liquid, such as wherein a main component of the liquid sample is water.

15. Use of a device according to any of embodiments 1-9, or a system according to any of embodiments 10-12, for extracting a volatile species from a liquid sample (20).

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

REFERENCES

1. Hynes, H. Ashraf, J. Bhardwaj, J. Hopkins, I. Johnston, and J. Shepherd, Sensors and Actuators A: Physical 74, 13 (1999).

2. D. Pomerantz, "Anodic bonding," (1968).
3. T. R. Henriksen, J. L. Olsen, P. C. Vesborg, I. Chorkendorff, and O. Hansen, Review of Scientific Instruments 80, 124101 (2009).

All of the above references are incorporated by reference in their entirety.

What is claimed is:

1. A device for extracting volatile species from an associated liquid and being suitable for connection to an inlet of an associated mass spectrometer, the device comprising:
   a. a chamber, wherein the volume of the chamber is 1 ml or less,
   b. a membrane, which:
      i. connects the inside of the chamber with the outside of the chamber,
      ii. forms a barrier for the liquid at zero, or near-zero, differential pressure between the inside and the outside of the chamber,
      iii. allows passage of the volatile species at zero, or near-zero, differential pressure between the inside and the outside of the chamber,
   c. an inlet capillary channel which connects the inside of the chamber with the outside of the chamber, the inlet capillary channel being arranged for intake of a carrier gas, wherein said inlet capillary channel is adapted to flow carrier gas into the chamber to maintain a chamber pressure near an ambient pressure of the associated liquid, and
   d. an outlet capillary channel which connects the inside of the chamber with the inlet of the mass spectrometer, the outlet capillary channel being arranged for connection with the inlet of the mass spectrometer, wherein the outlet capillary channel comprises a length (L), a width (W) and a height (H), and wherein the outlet capillary channel has a length to width ratio (L/W) or a length to height ratio (L/H) to provide a pressure at the inlet of the mass spectrometer that is lower than the chamber pressure such that a pressure reduction factor between the chamber pressure and the pressure at the inlet of the mass spectrometer is at least $10^5$,
wherein, upon immersion of the device into the liquid, the device allows the liquid to come into contact with the membrane.

2. A device according to claim 1, wherein a substantially plane side of the device comprises the membrane, and wherein an outer surface of the membrane is substantially flush with, or protruding from, said side of the device.

3. A device according to claim 1, wherein the volume of the chamber is 1 µl or less.

4. A device according to claim 1, wherein the pressure reduction factor is at least about $10^7$.

5. A device according to claim 1, wherein the inlet capillary channel has a length and a cross-sectional dimension to provide for limited back-diffusion from the chamber.

6. A device according to claim 1, wherein the membrane is perforated.

7. A device according to claim 1, wherein the device comprises at least
   e. a first structural element, and
   f. a second structural element and
wherein the membrane is formed in the first structural element and on a first side of the first structural element, and wherein the second structural element is joined to the first structural element on the opposite side of the first structural element with respect to the first side.

8. A device according to claim 7, wherein one, or more, cavities are formed in the first structural element, wherein one, or more, cavities correspond to one or more of
   g. the chamber,
   h. the inlet capillary channel,
   i. the outlet capillary channel,
and wherein the second structural element forms a barrier in least one of the one, or more, cavities.

9. A device according to claim 7 wherein one, or more, of
   j. the chamber,
   k. the inlet capillary channel,
   l. the outlet capillary channel,
are placed between
   the first side of the first structural element, and
   the second structural element.

10. A system for analysis comprising
   a device according to claim 1, and
   a mass spectrometer,
where the outlet capillary channel of the device is gasiously connected with the inlet of the mass spectrometer.

11. A system for analysis comprising
   a device according to claim 1, and
   a source of a carrier gas, which is connected to the chamber via the inlet capillary channel.

12. A system according to claim 10, wherein a characteristic time, corresponding to a time difference between
   m. a change in the associated liquid sample, and
   n. a point in time wherein a corresponding signal change as measured by the mass spectrometer reaches 1/e with respect to a saturation level of said signal is selected from the group consisting of 1 min. or less, 10 s or less, and 1 s or less.

13. A method for extracting a volatile species from a liquid sample, the method comprising:
   o. providing a device according to claim 1,
   p. exposing the membrane to the liquid sample, and
   q. allowing the volatile species to pass through the membrane,
wherein the method comprises
   passing a carrier gas into said chamber via said inlet capillary channel,
   passing the volatile species through the membrane into the chamber,
   passing the carrier gas with the volatile species via said outlet capillary channel,
wherein said outlet capillary channel provides a pressure reduction factor of at least $10^5$.

14. A method for extracting a volatile species from a liquid sample according to claim 13, wherein the method comprises
   at least partially immersing the device according to claim 1, so as to realize exposing the membrane to the liquid sample, the liquid sample being an aqueous liquid.

15. A method for extracting a volatile species from a liquid sample, the method comprising:
   o. providing a system according to claim 10,
   p. exposing the membrane to the liquid sample, and
   q. allowing the volatile species to pass through the membrane,
wherein the method comprises
   passing a carrier gas into said chamber via said inlet capillary channel,
   passing the volatile species through the membrane into the chamber,
   passing the carrier gas with the volatile species via said outlet capillary channel to the inlet of the mass spectrometer, wherein said outlet capillary channel provides a pressure reduction factor between the chamber pressure and the inlet of the mass spectrometer which is at least $10^5$.

16. A device according to claim 1, wherein the volume of the chamber is 100 nl or less.

17. A device according to claim 1, wherein the inlet capillary channel has a length and a cross-sectional dimension to provide that no back-diffusion occurs from the chamber.

18. A method according to claim 14, wherein a main component of the liquid sample is water.

19. A device according to claim 1, wherein the pressure at the inlet of the mass spectrometer is <$10^{-6}$ mbar.

20. A device according to claim 1, wherein the membrane has a substantially planar surface.

21. An assembly comprising a device of claim 1 and a mass spectrometer, wherein the mass spectrometer comprises an inlet, wherein said outlet capillary channel of the device is gasiously connected with the inlet of the mass spectrometer at a pressure which has been reduced by a pressure reduction factor of at least $10^5$.

22. The device of claim 1, wherein the length to width ratio or the length to height ratio is at least 25.

23. A system for analysis of a liquid having a volatile species, the system comprising:
    a mass spectrometer comprising an instrument chamber; and
    a device operatively connected to the instrument chamber of the mass spectrometer, said device defining a device chamber having a volume 1 ml or less, an inlet capillary channel that connects the device chamber with a device inlet arranged for intake of a carrier gas, and an outlet capillary channel connecting the device chamber with the instrument chamber of the mass spectrometer, wherein the device comprises a membrane that defines a barrier between the device chamber and the liquid at zero or near-zero different pressure between the device chamber and the liquid while allowing passage of the volatile species at zero or near-zero different pressure between the device chamber and the liquid;
    wherein flow of the carrier gas through the inlet capillary channel maintains a device chamber pressure at or near ambient pressure; and
    wherein the outlet capillary channel comprises a length (L), a width (W) and a height (H), and wherein the outlet capillary channel has a length to width (L/W) ratio or a length to height ratio (L/H) to provide a pressure in the instrument chamber of the mass spectrometer that is lower than the device chamber pressure such that a pressure reduction factor between the device chamber pressure and the pressure in the instrument chamber of the mass spectrometer is at least $10^5$.

24. The system of claim 23, wherein the outlet capillary channel is gasiously connected with an inlet of the mass spectrometer.

25. A device for extracting volatile species from a liquid and comprising an outlet capillary channel suitable for gasiously connecting to an inlet of a mass spectrometer, the device comprising:
    a chamber having a volume of 1 ml or less,
    a membrane which connects the inside of the chamber with the outside of the chamber, wherein the membrane is impermeable to liquid and allows passage of volatile species at zero differential pressure,
    wherein the outlet capillary channel comprises a length (L), a width (W) and a height (H), and wherein the outlet capillary channel has a length to width (L/W) ratio or a length to height ratio (L/H) to provide a pressure at the inlet of the mass spectrometer that is lower than a chamber pressure such that a pressure reduction factor between the chamber pressure and the pressure at the inlet of the mass spectrometer is at least $10^5$.

26. The device of claim 25, wherein the membrane has an outer surface facing away from the chamber, and wherein the membrane allows passage of volatile species into the chamber when the outer surface of the membrane contacts the liquid.

27. The device of claim 25, wherein the device comprises an inlet into the chamber suitable for intake of gas.

28. The device of claim 27, wherein the inlet is an inlet capillary channel comprising a pressure controller and being arranged for intake of said carrier gas into the chamber to maintain a chamber pressure at an ambient pressure of the associated liquid.

29. The device of claim 25, wherein the outlet capillary channel provides the pressure reduction factor without a differential pump.

* * * * *